(12) United States Patent
Sato et al.

(10) Patent No.: US 7,937,048 B2
(45) Date of Patent: May 3, 2011

(54) SIGNAL TRANSMISSION APPARATUS AND SIGNAL TRANSMISSION METHOD

(75) Inventors: Yoichi Sato, Tsukuba (JP); Tetsuya Higuchi, Tsukuba (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 763 days.

(21) Appl. No.: 11/997,482

(22) PCT Filed: Jul. 19, 2006

(86) PCT No.: PCT/JP2006/314223
§ 371 (c)(1),
(2), (4) Date: Jan. 31, 2008

(87) PCT Pub. No.: WO2007/015370
PCT Pub. Date: Feb. 8, 2007

(65) Prior Publication Data
US 2010/0003933 A1   Jan. 7, 2010

(30) Foreign Application Priority Data

Aug. 1, 2005   (JP) ................. 2005-222991
Jan. 10, 2006  (JP) ................. 2006-002122

(51) Int. Cl.
*H04B 1/02* (2006.01)
(52) U.S. Cl. ............. 455/108; 455/114.2; 455/127.5; 375/300
(58) Field of Classification Search ......... 455/108, 455/114.2, 127.1, 127.2, 127.5; 375/135, 375/300
See application file for complete search history.

(56) References Cited

U.S. PATENT DOCUMENTS

| | | | |
|---|---|---|---|
| 5,559,835 A | | 9/1996 | Betts |
| 5,651,030 A | * | 7/1997 | Wong et al. ............. 375/316 |
| 5,878,086 A | | 3/1999 | Hulyalkar |
| 6,029,058 A | * | 2/2000 | Namgoong et al. ......... 455/324 |
| 6,356,748 B1 | * | 3/2002 | Namgoong et al. ......... 455/324 |
| 6,920,172 B2 | * | 7/2005 | Williams et al. ............. 375/136 |

(Continued)

FOREIGN PATENT DOCUMENTS

JP    7-154443    6/1995

(Continued)

OTHER PUBLICATIONS

PCT Search Report for Serial No. PCT/JP2006/314223.

(Continued)

*Primary Examiner* — Nhan Le
(74) *Attorney, Agent, or Firm* — McCormick, Paulding & Huber LLP

(57) ABSTRACT

A signal transmission apparatus of the invention comprises: a correlator 12 for shaping a spectrum of a signal; and a precoder 12 disposed on a previous stage of the correlator and including an adder which subtracts an output signal of a feedback filter from an input signal, a modulo arithmetic unit which inputs an output signal of the adder and executes modulo arithmetic operation, and the feedback filter which inputs an output signal of the modulo arithmetic unit and is provided with a transfer function obtained by subtracting 1 from a transfer function of the correlator. The correlator may be IIR filter means having a desired notch characteristic. By disposing a correlator which can freely shape a transmission signal spectrum containing a deep notch and suppress only a specified band on a receiving side, the suppression of an external noise can also be realized.

15 Claims, 16 Drawing Sheets

U.S. PATENT DOCUMENTS

| | | | |
|---|---|---|---|
| 7,289,568 B2 * | 10/2007 | Harp et al. ................... | 375/263 |
| 7,746,939 B2 * | 6/2010 | McCrady ....................... | 375/260 |
| 2003/0091111 A1 | 5/2003 | Vaananen | |

FOREIGN PATENT DOCUMENTS

| | | | |
|---|---|---|---|
| JP | 2000-500958 A | 1/2000 | |
| JP | 2003-188781 | 7/2003 | |
| JP | 2003-524337 A | 8/2003 | |
| JP | 2004-201310 A | 7/2004 | |
| JP | 2005-51768 | 2/2005 | |

OTHER PUBLICATIONS

Article by M. Tomlinson entitled "New Automatic Eqaliser Employing Modulo Arithmetic" Electronic Letters, Mar. 25, 1971, vol. 7, No. 5/6, pp. 138-139.

Article by Hiroshi Harashima and Hiroshi Miyakawa entitled "Matched-Transmission Technique for Channels With Intersymbol Interface", IEEE Transations on Communications, vol. COM-20, No. 4, Aug. 1972, pp. 774-780.

* cited by examiner

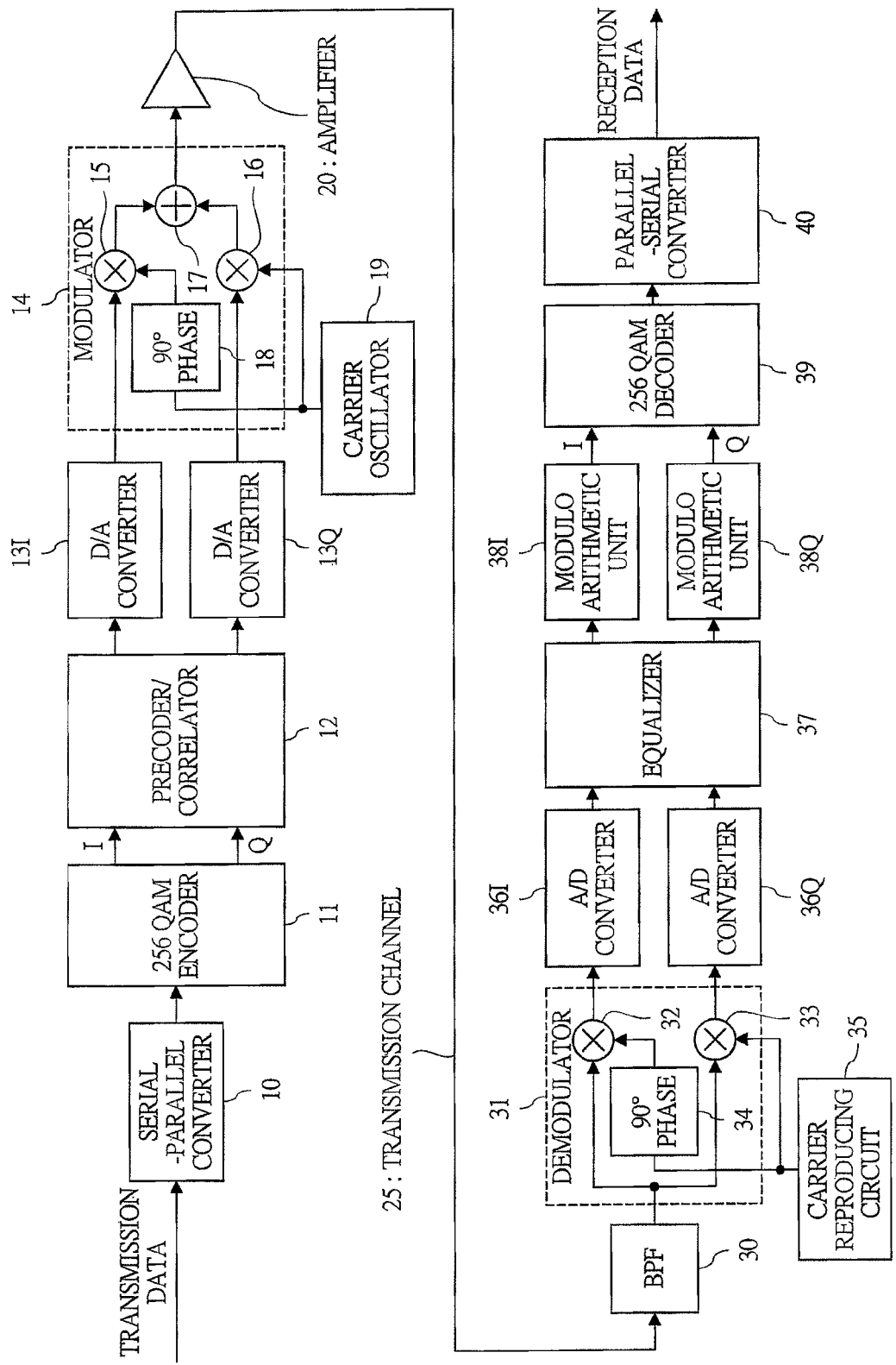

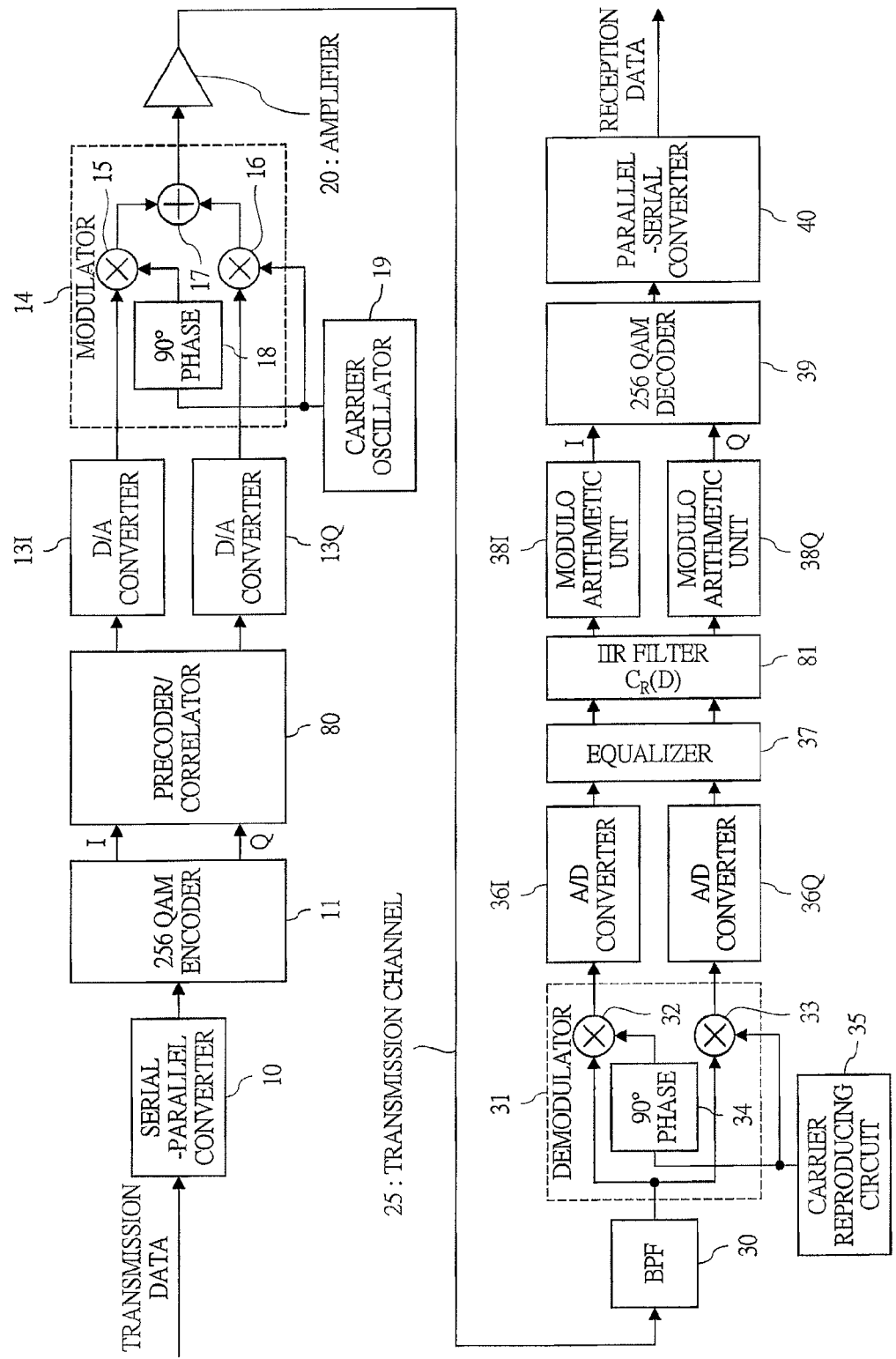

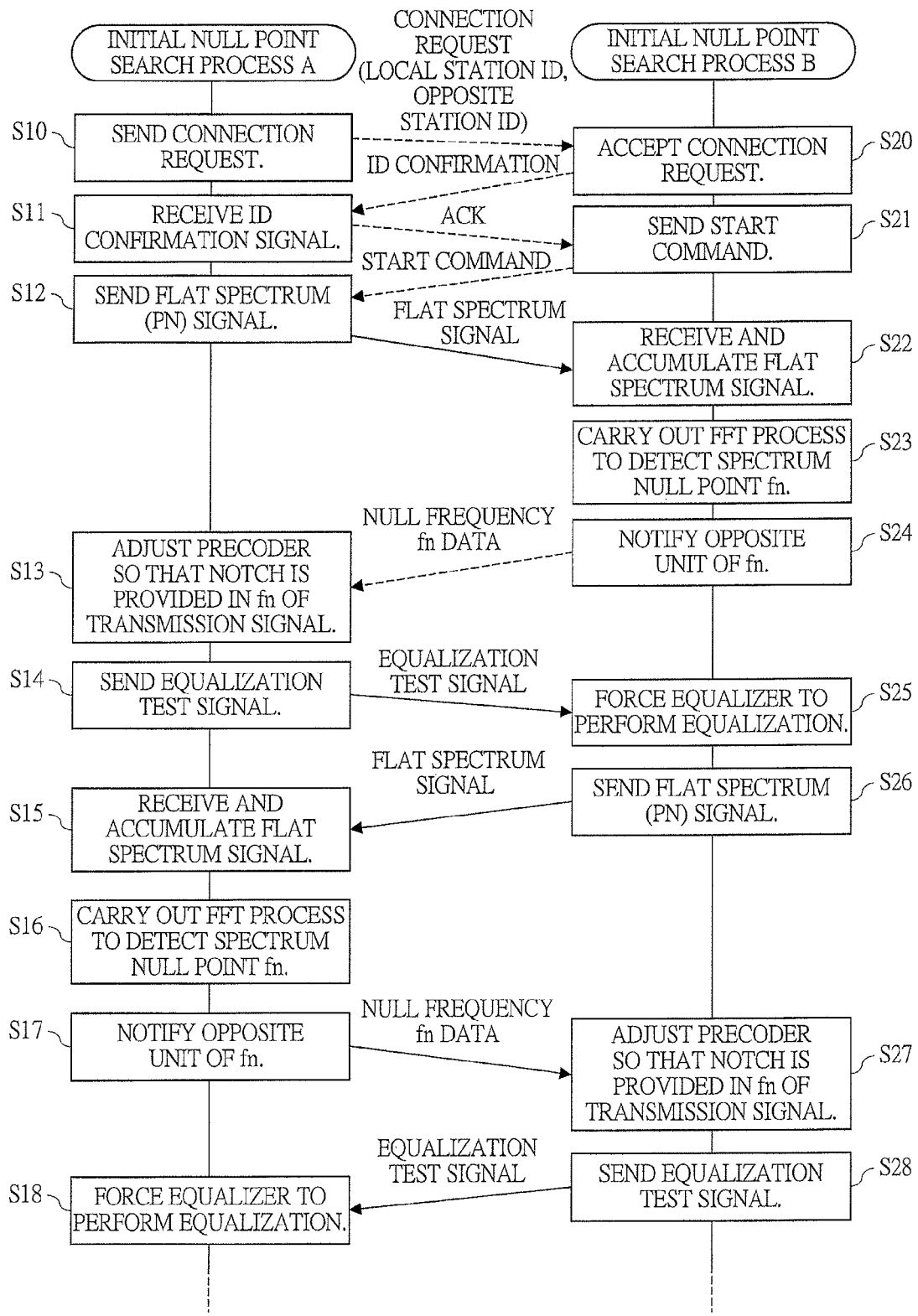

SIGNAL TRANSMISSION APPARATUS AND SIGNAL TRANSMISSION METHOD

CROSS REFERENCE TO RELATED APPLICATIONS

This application is entitled to the benefit of and incorporates by reference essential subject matter disclosed in International Patent Application No. PCT/JP2006/314223 filed on Jul. 19, 2006; Japanese Patent Application No. 2005-222991 filed Aug. 1, 2005; and Japanese Patent Application No. 2006-002122 filed Jan. 10, 2006.

TECHNICAL FIELD

The present invention relates to a signal transmission apparatus and a signal transmission method. More particularly, it relates to a signal transmission apparatus and a signal transmission method capable of effectively transmitting signals while suppressing a transmission power or an external noise of a specified band in a usable frequency band.

BACKGROUND ART

In recent years, attentions have been paid to the PLC (Power Line Communication) system. The PLC system is a data transmission system which bidirectionally connects each home and a relay station to the Internet or the like provided in an electric substation or an electric pole using a power line of the commercial power source and bidirectionally connects a communication network and each electric appliance using a power line of the commercial power source in a home. As the PLC system, the one which performs communications according to OFDM (Orthogonal Frequency Division Multiplexing) transmission method using a frequency in the band of, for example, about 30 MHz or lower has been proposed.

In Japanese Patent Application Laid-Open Publication No. 2005-051768 described below, a PLC system using the OFDM transmission method has been disclosed. In this system, in order to prevent the electromagnetic radiation generated by a PLC signal transmitted through a power supply line from interfering with a broadcasting RF signal radiated in the same frequency band, the PLC node scans an entire frequency range designated for the power line communication so as to detect a frequency band occupied by the broadcasting service. Then, the frequency band for the power line communication excluding the above-described frequency band is allocated.

Also, Japanese Patent Application Laid-Open Publication No. 2003-188781 described below has disclosed a power line carrier noise resistant communication system in which the noise resistant characteristics are improved so that stable data communication can be performed. This system comprises: means for diluting the influence of the discontinuous noise by distributing signals to a time axis and a frequency axis by Walsh transform and OFDM modulation and demodulation as a transmission circuit and a receiving circuit in a power line carrier communication apparatus; and means for detecting the noise not diluted by the above means by wavelet analysis, thereby cutting the noise.

In this system, the former means deals with a relatively small discontinuous noise and both the former and latter means deal with a relatively large discontinuous noise, whereby the discontinuous noises of arbitrary sizes are reduced. Also, by disposing the power line carrier communication apparatus at an arbitrary place of household wiring such as power line laid in advance in a home or an office and transmitting signals via a coupling circuit in the power line carrier communication apparatus, data communications are carried out between the power line carrier communication apparatuses or with an external communication apparatus.

FIG. 17 is a block diagram showing an example of the configuration of the PLC system in a home. A power line (AC 100 V) is connected to an indoor wiring 304 through a low pass filter 303 which allows electricity of not more than several hundreds Hz to pass through. Also, a master MODEM 302 is connected to the indoor wiring 304 and the master MODEM 302 having a router function is connected to the Internet (server) through an optical terminating device 301, an optical fiber line 330 and others.

The indoor wiring 304 of an ordinary home is branched to an arbitrary number of lines at arbitrary positions (length) and connected to respective load apparatuses A (310) to D (322) through an outlet 305 or a switch 306. The load apparatus includes, for example, various apparatuses using electric power such as a personal computer, a TV set, a refrigerator, a luminaire, an air conditioner, a vacuum cleaner and the like. Some of these load apparatuses such as the personal computer are equipped with a slave MODEM 311 and performs data communication with the master MODEM 302 or other slave MODEM using a frequency in the band of, for example, about 30 MHz or lower through the indoor wiring 304.

The indoor wiring 304 can be regarded as a pair cable type transmission line in the data transmission, and the indoor wiring 304 is branched to plural lines and each line length varies by connecting/disconnecting a load apparatus to/from the outlet. Further, the line length and the terminating impedance are changed also by turning on/off a switch of any load apparatus.

Therefore, reflection and resonance of signals occur due to the line length up to a branch point or a terminal point and the terminating impedance, so that a spectrum null point in which signals of a specified frequency are not transmitted at all is generated and the frequency of the null point is frequently changed depending on the condition of the load apparatus. Further, when the null point is generated, a problem that an equalizer diverges and cannot perform equalization is caused.

The above-described conventional PLC system uses the OFDM transmission method, but the OFDM transmission method is a block transmission method and the roll-off of a transmission pulse needs to be decreased for increasing the use efficiency of a frequency band. However, if the roll-off is decreased, a guard interval signal to be applied before/after a block is extended, and the problem that the transmission efficiency is lowered is caused.

Also, although a deep notch characteristic which largely suppresses only a specified band is desired to be realized in the PLC system, since the OFDM transmission method is a block transmission method, this deep notch characteristic cannot be realized in the vicinity of a border of adjoining blocks. Further, the notch filter needs to be attached to a latter stage of the OFDM if it is intended to realize the notch for suppressing the electromagnetic radiation accurately, so that the resulting long transient response affects the adjoining blocks and it is difficult to erase this influence. Further, if it is intended to realize the notch for removing an external noise, the data distribution to corresponding sub channels of the OFDM has to be stopped, so that such a complicated process as rebuilding of the block is necessary.

In the embodiment of the present invention described later, a precoder is used. This precoder has been studied as one type of the equalizer corresponding to an uneven characteristic of a communication transmission channel.

According to M. TOMLINSON, "NEW AUTOMATIC EQUALISER EMPLOYING MODULO ARITHMETIC", ELECTRONICS LETTERS, Mar. 25, 1971, Vol. 7, No. 5/6, pp. 138-139, this equalizer performs the pre-equalization by providing an IIR (Infinite Impulse Response) filter having an inverse characteristic of impulse response of the transmission channel on a sending side, and at this time, by replacing the addition with the modulo N operation, it becomes possible to prevent the output of the IIR filter from being increased and unstable.

Further, according to HIROSHI HARASHIMA, HIROSHI MIYAKAWA, "Matched-Transmission Technique for Channels With Intersymbol Interference" IEEE TRANSACTIONS ON COMMUNICATIONS, vol. COM-20, No. 4, August 1972, pp. 774-780, the similar method can be obtained by generalizing the technology for removing intersymbol interference of a narrow band transmission channel, which is conventionally referred to as partial response or correlation level symbol.

However, although the above-described impulse response is based on the premise that the initial response under the delay time 0 is set to 1, the impulse response of the communication transmission channel takes a vibration waveform which starts with a forerunner having a small amplitude, gradually increases and then attenuates. Consequently, in the above-described pre-equalization of the IIR filter (corresponding to "precoder" in this specification), the number of levels of the reception signal extremely increases, and thus the practical use thereof cannot be achieved without any special treatment. Further, the pre-equalization technology in the above-mentioned documents is just a technology for equalizing the transmission channel.

DISCLOSURE OF THE INVENTION

An object of the present invention is to provide a signal transmission apparatus and a signal transmission method capable of solving the above-described problems of the conventional technology, suppressing a transmission power or an external noise of a specified band in a usable frequency band, and effectively transmitting a signal.

The signal transmission apparatus and the signal transmission method of the present invention have accomplished the above-described object by using a transmission method capable of achieving arbitrary deep notch characteristic with almost no reduction in the transmission efficiency and setting the notch in accordance with the characteristic of the transmission channel.

A signal transmission apparatus according to the present invention is mainly characterized by comprising: correlator means for shaping a spectrum of a signal into a spectrum containing a desired notch; and precoder means disposed on a previous stage of the correlator and including adding means which subtracts an output signal of feedback filter means from an input signal, modulo arithmetic means which inputs an output signal of the adding means and executes modulo arithmetic operation, and the feedback filter means which inputs an output signal of the modulo arithmetic means and is provided with a transfer function obtained by subtracting 1 from a transfer function of the correlator means.

Also, the signal transmission apparatus described above is characterized in that the correlator means is IIR filter means having a desired notch characteristic. Further, the signal transmission apparatus described above is characterized in that at least a part of a function of the correlator means is provided in a receiving side unit.

Also, the signal transmission apparatus described above is characterized by further comprising: QAM coding means disposed on a previous stage of the precoder means; and QAM modulating means disposed on a latter stage of the correlator means. Further, the signal transmission apparatus described above is characterized in that the feedback filter means doubles as a part of a function of the correlator means.

A signal transmission method according to the present invention is mainly characterized by comprising: a step of inputting a result of subtracting an output signal of feedback filter means from an input signal and executing modulo arithmetic operation, and outputting resultant signals to correlator means and the feedback filter means having a transfer function obtained by subtracting 1 from a transfer function of the correlator means; and a step of shaping a spectrum of a signal into a spectrum containing a desired notch by the correlator means provided with a characteristic represented by the transfer function.

Also, the signal transmission apparatus described above is mainly characterized by comprising: measuring means for measuring a frequency of a spectrum null point of a transmission channel; and adjusting means for adjusting the correlator means and the precoder means based on a measured notch frequency of the transmission channel.

Also, the signal transmission apparatus described above is characterized in that the measuring means includes: means for sending a flat spectrum signal; null point detecting means for receiving the flat spectrum signal from an opposite unit and generating spectrum information by Fourier transform, thereby detecting the frequency of the spectrum null point; and notifying means for notifying frequency information of the detected null point to the opposite unit.

Alternatively, the signal transmission apparatus described above is mainly characterized by comprising: sweep control means for adjusting the precoder means and the correlator means so that a notch frequency moves at a speed which an equalizer on a receiving side can follow; transmission quality monitoring means for recording a transmission quality of a transmission channel together with a time position and detecting a time position in which the transmission quality is optimum; means for converting the time position to a notch frequency; and adjusting means for adjusting the correlator means and the precoder means based on the converted notch frequency.

Also, the signal transmission apparatus described above is characterized in that the sweep control means notifies a signal transmission apparatus on an opposite side of a sweep start, and the signal transmission apparatus on the opposite side records a passage time since the sweep start as the time position.

Also, the signal transmission apparatus described above is characterized in that a transmission function representing a frequency characteristic of the feedback filter means includes a transfer function which approximates frequency-amplitude characteristics of a transmission channel and minimizes the number of levels of a symbol of a transmission correlating signal.

A signal transmission method according to the present invention is mainly characterized by comprising: a step of measuring a frequency of a spectrum null point of a transmission channel; and a step of, based on the measured frequency of the null point of the transmission channel, adjusting correlator means for shaping a spectrum of a signal and precoder means disposed on a previous stage of the correlator and including adding means which subtracts an output signal of feedback filter means from an input signal, modulo arithmetic means which inputs an output signal of the adding means and executes modulo arithmetic operation, and the feedback filter means which inputs an output signal of the modulo arithmetic means and is provided with a transfer function obtained by subtracting 1 from a transfer function of the correlator means.

Alternatively, a signal transmission method according to the present invention is mainly characterized by comprising: a step of adjusting precoder means for shaping a spectrum of a signal and precoder means so that a notch frequency moves at a speed which an equalizer on a receiving side can follow, the precoder means being disposed on a previous stage of the correlator and including adding means which subtracts an output signal of feedback filter means from an input signal, modulo arithmetic means which inputs an output signal of the adding means and executes modulo arithmetic operation, and the feedback filter means which inputs an output signal of the modulo arithmetic means and is provided with a transfer function obtained by subtracting 1 from a transfer function of the correlator means; a step of recording a transmission quality of a transmission channel on a receiving side and detecting a time position in which the transmission quality is optimum; a step of converting the time position to a notch frequency; and a step of adjusting the correlator means and the precoder means based on the converted notch frequency.

The signal transmission apparatus and the signal transmission method of the present invention have following effects.

(1) A transmission signal spectrum including a deep notch can be formed freely.

(2) An external noise can be suppressed by suppressing only a specified band in a receiving unit.

(3) A non-block transmission method can be realized and high-speed transmission with little delay is possible.

(4) A circuit configuration and signal process can be simplified.

(5) An excellent transmission efficiency can be retained even in a transmission channel which attenuates largely over a wide band by including the amplitude characteristic of the transmission channel in a feedback filter of the precoder.

(6) By setting/updating the notch in accordance with a changing frequency characteristic of a transmission channel, an equalizer does not diverge and can perform equalization, so that the data transmission efficiency can be improved.

(7) A transmission signal spectrum including a deep notch can be formed freely, and it is possible to handle a plurality of notches. Therefore, it is possible to flexibly respond to the characteristic of the transmission channel.

(8) An external noise can be suppressed by suppressing only a specified band in the receiving unit. Also, the generation of noise to outside in a predetermined band can be suppressed.

BRIEF DESCRIPTION OF THE DRAWINGS

FIG. 1 is a block diagram showing the configuration of an embodiment of a signal transmission apparatus of the present invention;

FIG. 6 is a block diagram showing the configuration of a second embodiment of the signal transmission apparatus of the present invention;

FIG. 10 is a flow chart showing the contents of null point search process 1 of the present invention;

BEST MODE FOR CARRYING OUT THE INVENTION

Figure 2A:
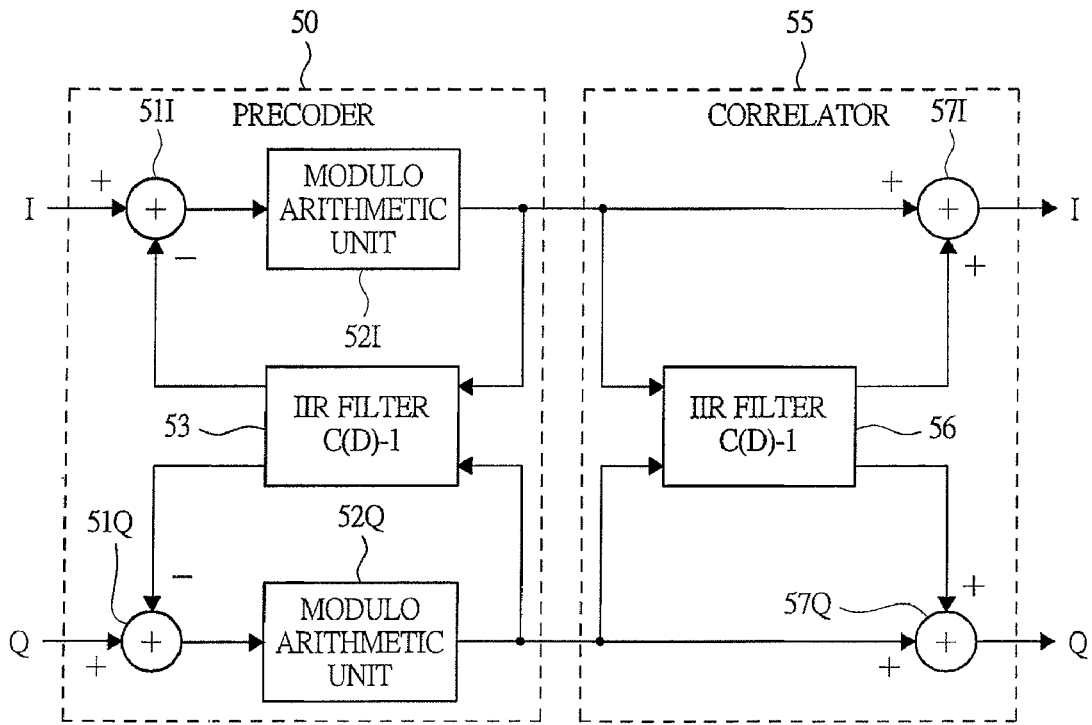
FIG. 2A is a block diagram showing the configuration of a precoder/correlator 12 of the present invention.

Hereinafter, the embodiments of the present invention will be described in detail with reference to the accompanying drawings.

The first embodiment of the present invention will be described below. FIG. 1 is a block diagram showing the configuration of the embodiment of the signal transmission apparatus of the present invention. An upper part of FIG. 1 corresponds to a sending unit and a lower part thereof corresponds to a receiving unit. Digital transmission data is converted to, for example, an 8-bit parallel signal by a serial-parallel converter 10. The 8-bit parallel signal is inputted to a 256 QAM encoder 11, and the 256 QAM encoder 11 converts the signal to a 256 QAM signal having 16×16 lattice by a known method and outputs signals I and Q.

A precoder/correlator 12, details of which will be described later, performs the processes according to the present invention to the signals I and Q so as to obtain a desired notch characteristic. The function and process of the sending unit except the precoder/correlator 12 are the same as those of a conventional QAM sending unit. Note that the processes before the precoder/correlator 12 can be executed by an arithmetic operation by DSP.

The signals I and Q after the process are converted to analog signals by D/A converters 13I and 13Q, respectively, and further QAM-modulated by a modulator 14. In the meantime, a carrier signal outputted from a carrier oscillator 19 is inputted to a multiplier 16 and a 90° phase shifter 18 and an output of the 90° phase shifter 18 is inputted to a multiplier 15, and then outputs of the two multipliers 15 and 16 are inputted to an adder 17. An output signal of the adder 17 is amplified by an amplifier 20 and sent to a transmission channel 25 such as a power line.

A reception signal passing through a BPF (band pass filter) 30 is QAM-demodulated by a demodulator 31 in a receiving unit. A carrier reproducing circuit 35 generates a carrier synchronized in phase from the reception signal. A/D converters 36I and 36Q A/D convert the demodulated signals, and an equalizer 37 executes a filter process of reverse characteristic to the frequency characteristic of the transmission channel so as to equalize the distortion of the transmission channel.

Modulo arithmetic units 38I and 38Q perform a modulo arithmetic process according to the present invention to the output signals of the equalizer 37 and output the signals I and Q. The signals I and Q are inputted to a 256 QAM decoder 39, and the 256 QAM decoder 39 converts the signals to an 8-bit parallel signal by a known method. A parallel-serial converter 40 converts the 8-bit parallel signal to a serial signal.

The function and process of the receiving unit except the modulo arithmetic units 38I and 38Q are the same as those of the conventional QAM receiving unit. In the meantime, it is also possible to provide the sending unit, the receiving unit and the hybrid circuit to both ends of the transmission channel 25 so as to enable entire duplex transmission. Also, the process after the equalizer can be executed by an arithmetic operation by DSP.

Figure 2B:
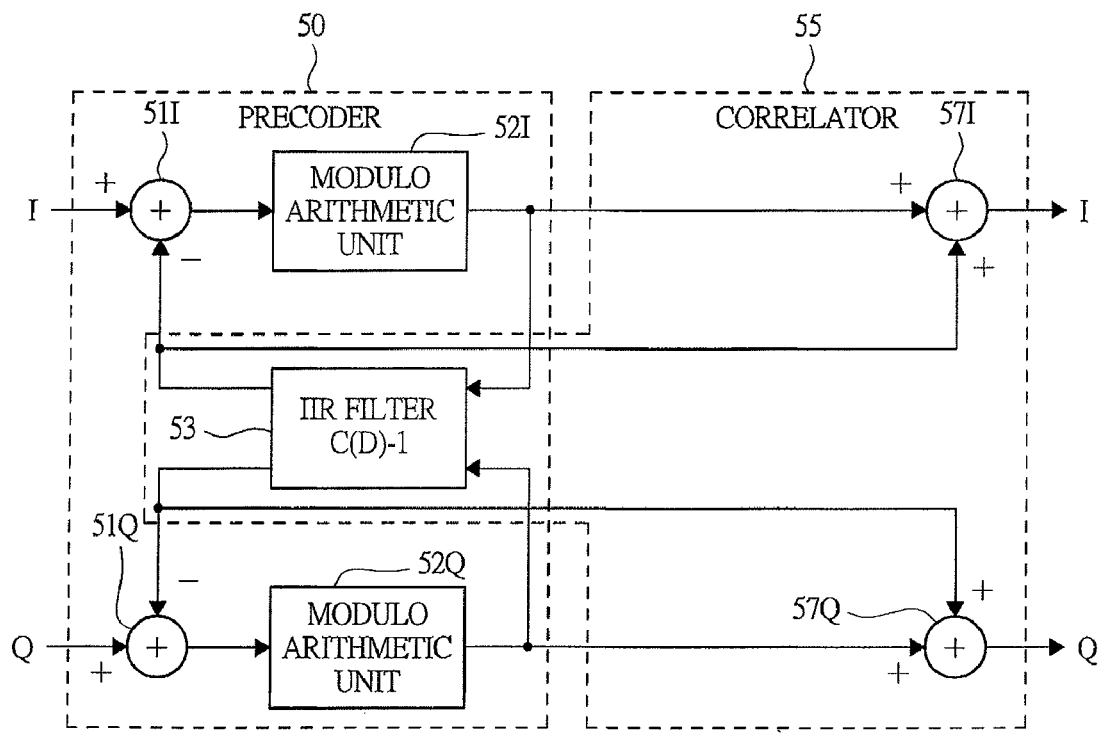
FIG. 2B is a block diagram showing the configuration of a precoder/correlator 12 of the present invention.

FIG. 2A and FIG. 2B are block diagrams showing the configuration of the precoder/correlator 12 of the present invention. FIG. 2A is a functional block diagram thereof, and FIG. 2B shows the configuration of the precoder/correlator 12 in which an IIR filter 56 performing the same process as an IIR filter 53 is omitted from the configuration in FIG. 2A.

A precoder 50 includes adders 51I and 51Q corresponding to the signals I and Q, modulo arithmetic units 52I and 52Q and the IIR filter 53 functioning as a feedback filter. The adders 51I and 51Q subtract an output signal of the IIR filter 53 from the input signals I and Q, respectively. The modulo arithmetic units 52I and 52Q perform modulo arithmetic operation to the output signals of the adders 51I and 51Q, respectively.

Figure 4:
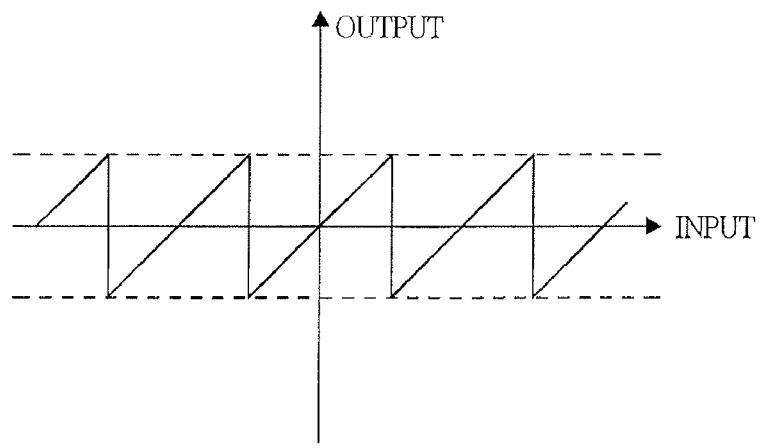
FIG. 4 is a graph showing the input/output characteristic of a modulo arithmetic unit.

FIG. 4 is a graph showing the input/output characteristic of the modulo arithmetic unit. As shown in the FIG. 4, the modulo arithmetic unit subtracts or adds a value obtained by multiplying a predetermined value corresponding to the width of a predetermined range by an integer from/to an input value so that the output value falls within the predetermined range.

Figure 3:
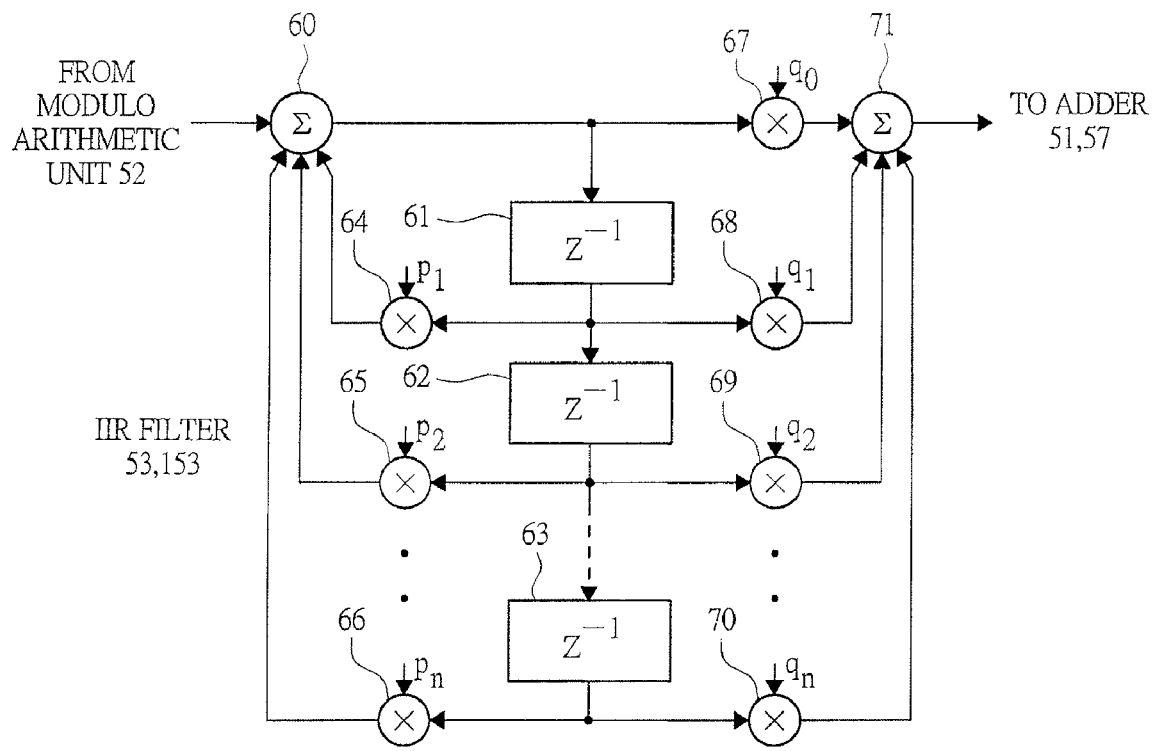
FIG. 3 is a block diagram showing the configuration of an IIR filter.

The outputs of the modulo arithmetic units 52I and 52Q are outputted to the correlator 55 on a next stage and also inputted to the IIR filter 53. FIG. 3 is a block diagram showing the configuration of the IIR filter. Note that the IIR filter having such a configuration has been well known.

In the IIR filter 53, arithmetic operation is carried out with using a complex number having the inputted signal I as a real number and the signal Q as an imaginary number, and the real number portion and the imaginary number portion of the complex number which are output signals of the filter are outputted to the adder 51I and the adder 51Q, respectively. The transfer function H of the filter is assumed to be H=C(D)−1, where D=$z^{-1}$. The C(D) is a transfer function which indicates a desired notch characteristic defined by the following Equation 1.

$$C(D) = \prod_{i=1}^{N} \frac{1 - a_i e^{j\pi f_i} D}{1 - b_i e^{j\pi f_i} D} \quad \text{[Equation 1]}$$

$$0 < a_i < b_i \le 1$$

Π designates an operator for multiplication of each term, N designates the number of notches, a and b designate coefficients for determining the depth and width of the notch, and f designates a notch frequency. Respective coefficients $p_1$ to $p_n$ and $q_0$ to $q_n$ of the IIR filter are obtained by calculating the coefficients by expanding the denominator and numerator of H=C(D)−1 based on the above-described C(D).

In the correlator 55, the output of the IIR filter 56 which executes the same process as the IIR filter 53 and the outputs of the modulo arithmetic units 52I and 52Q are added up by the two adders 57I and 57Q and then outputted.

Note that the correlator 55 shown in FIG. 2A is equivalent to a filter whose transfer function is C(D). Since the output signal of the precoder 50 is a random signal, the spectrum of the output signal of the correlator 55 is shaped into a form corresponding to the transfer function C(D).

Figure 5A:
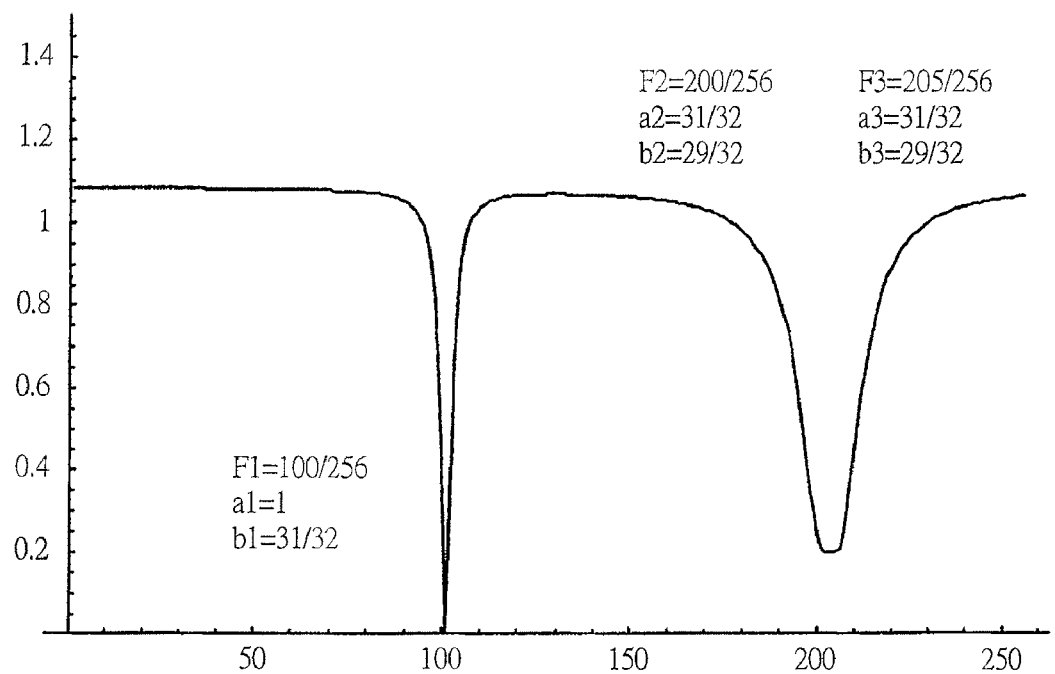
FIG. 5A is a graph showing a frequency amplitude characteristic corresponding to an example of C(D)
Figure 5B:
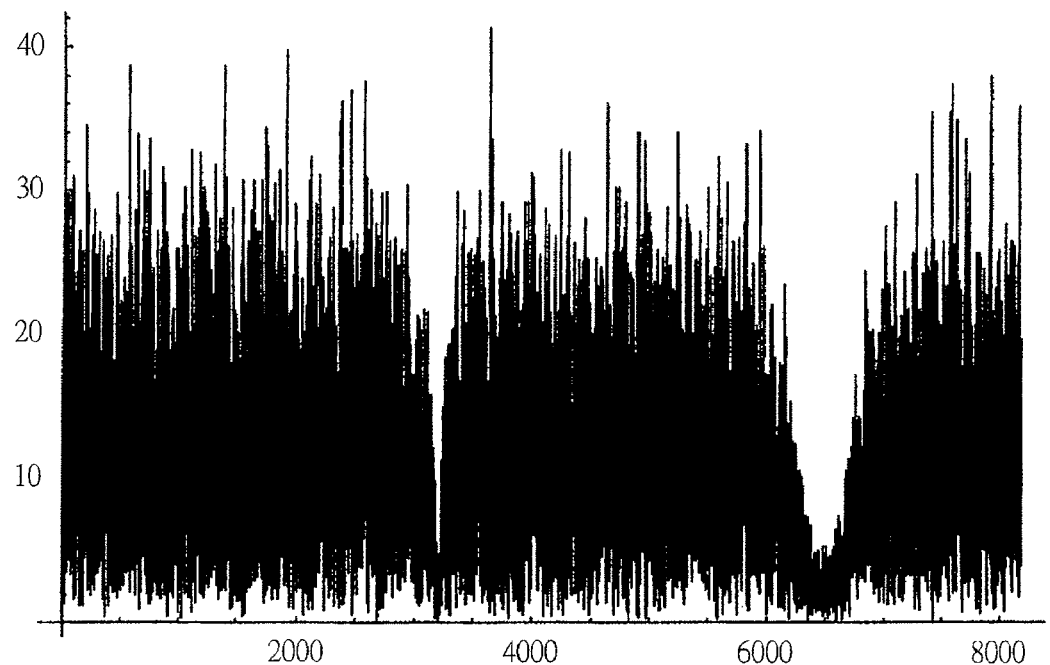
FIG. 5B is a graph showing a simulation result of the output signal of the correlator.

FIG. 5A and FIG. 5B are graphs showing a frequency amplitude characteristic corresponding to an example of C(D) and a simulation result of the output signal of the correlator. Three notches are provided in this example as described in FIG. 5A, and since the notches of frequencies F2 and F3 are set adjacent to each other, they are expressed as a single notch in the graph. As shown in FIG. 5B, the simulation result of the output signal of the correlator matches well with the characteristic of FIG. 5A, and parts of the output signal are suppressed.

In the method of providing the notch characteristic according to the present invention, a specified frequency component is not simply damped from a generated transmission signal, but an entire signal is processed so that the power of the specified frequency component is reduced. Therefore, the transmitted QAM signal does not have the lattice arrangement at an equal interval.

Further, if distribution of a small signal power is allowed in the notch band, the notch portion does not need to be restored by the equalizer in the receiving unit, and the original signal can be reproduced only by passing through the modulo arithmetic unit, so that the deterioration of the transmission efficiency is slight as compared with a case where no notch is provided.

FIG. 6 is a block diagram showing the configuration of the second embodiment of the signal transmission apparatus of the present invention. In this embodiment, a part (or all) of the function of the correlator 55 in the above-described first embodiment is moved to the receiving side, whereby the suppression of a specified band of the transmission signal and the suppression of an external noise are achieved at the same time. The difference between the second embodiment and the first embodiment lies in the characteristic of a filter in a precoder/correlator 80 and an IIR filter 81 added to the receiving unit side. Hereinafter, the difference from the first embodiment will be described.

Figure 7:
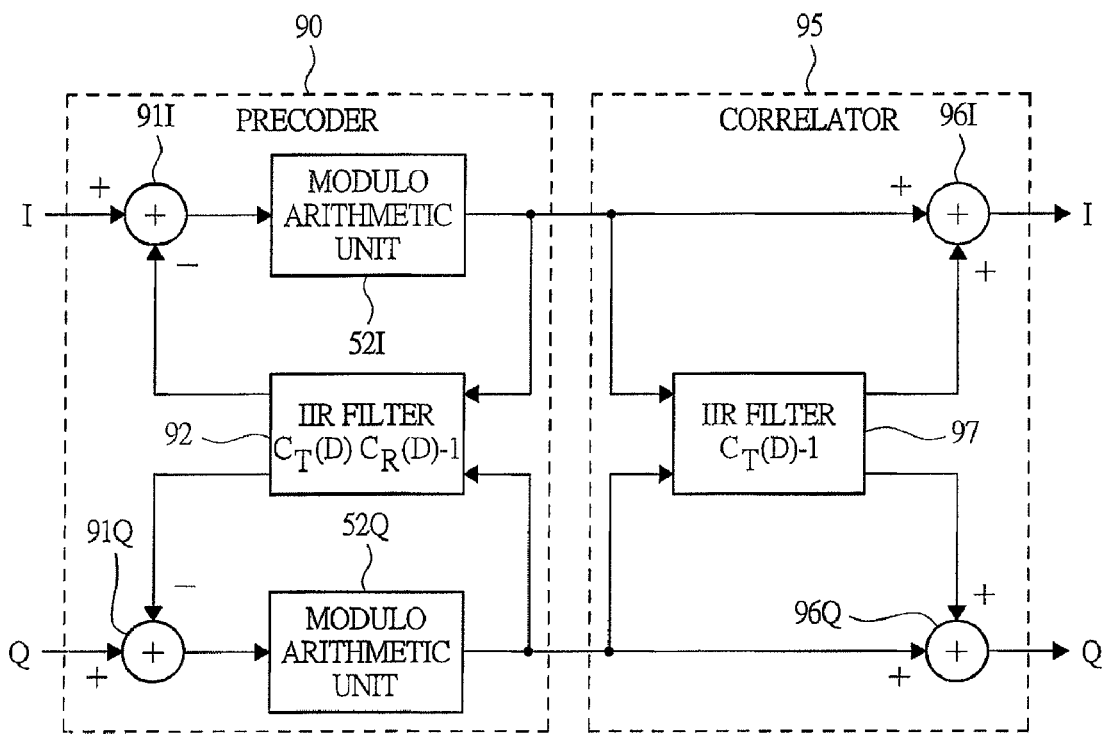
FIG. 7 is a block diagram showing the configuration of a precoder/correlator 80 of the second embodiment.

FIG. 7 is a block diagram showing the configuration of the precoder/correlator 80 of the second embodiment. Although the block of the precoder/correlator 80 of the second embodiment is the same as that of the first embodiment shown in FIG. 2, the transfer function set in an IIR filter 92 of a precoder 90 is a product of a transfer function $C_T(D)$ corresponding to the notch characteristic for suppressing the transmission signal and a transfer function $C_R(D)$ corresponding to the notch characteristic for suppressing the external noise signal in the receiving unit. Note that the transfer functions $C_T(D)$ and $C_R(D)$ are expressed by the following Equation 2 and Equation 3.

$$C_T(D) = \prod_{i=1}^{N} \frac{1 - a_i e^{j\pi f_i D}}{1 - b_i e^{j\pi f_i D}} \quad \text{[Equation 2]}$$
$$0 < a_i < b_i \leq 1$$

$$C_R(D) = \prod_{i=1}^{N} \frac{1 - c_i e^{j\pi f_i D}}{1 - d_i e^{j\pi f_i D}} \quad \text{[Equation 3]}$$
$$0 < c_i < d_i \leq 1$$

A transfer function $C_T(D)$ corresponding to the notch characteristic for suppressing the transmission signal is set in an IIR filter 97 of the correlator 95. Therefore, the transmission signal has the notch characteristic corresponding to the transfer function $C_T(D)$.

On the receiving unit side, output signals of the equalizer 37 are inputted to the IIR filter 81. The transfer function $C_R(D)$ corresponding to the notch characteristic for suppressing the external noise signal is set in the IIR filter 81 in which a part of the function of the correlator is moved to the receiving side unit.

For example, when an external noise exists in a specified frequency, the transfer function $C_R(D)$ is set to the characteristic for notching the frequency of the noise. Then, the noise power is suppressed by the IIR filter 81 on the receiving unit side, and the data error rate can be improved.

Note that, in the second embodiment, information of the transfer function $C_R(D)$ needs to be transferred to the receiving side. Further, although the second embodiment has disclosed the case where notching of both the transmission signal and external noise is carried out, it is also possible to carry out only the notching of the external noise, and in this case, the correlator 95 on the sending unit side is not required.

Although the first and second embodiments have been described above, the present invention may be modified as follows. Examples of using the IIR filter which can obtain the notch characteristic easily have been disclosed in the embodiments above. However, the configuration of the filter is arbitrary and the FIR filter may be used to carry out the embodiments.

Although the signal transmission apparatus of the present invention is preferable for the PLC system, the signal transmission apparatus of the present invention can be applied to any digital signal transmission including the PLC system.

Figure 8:
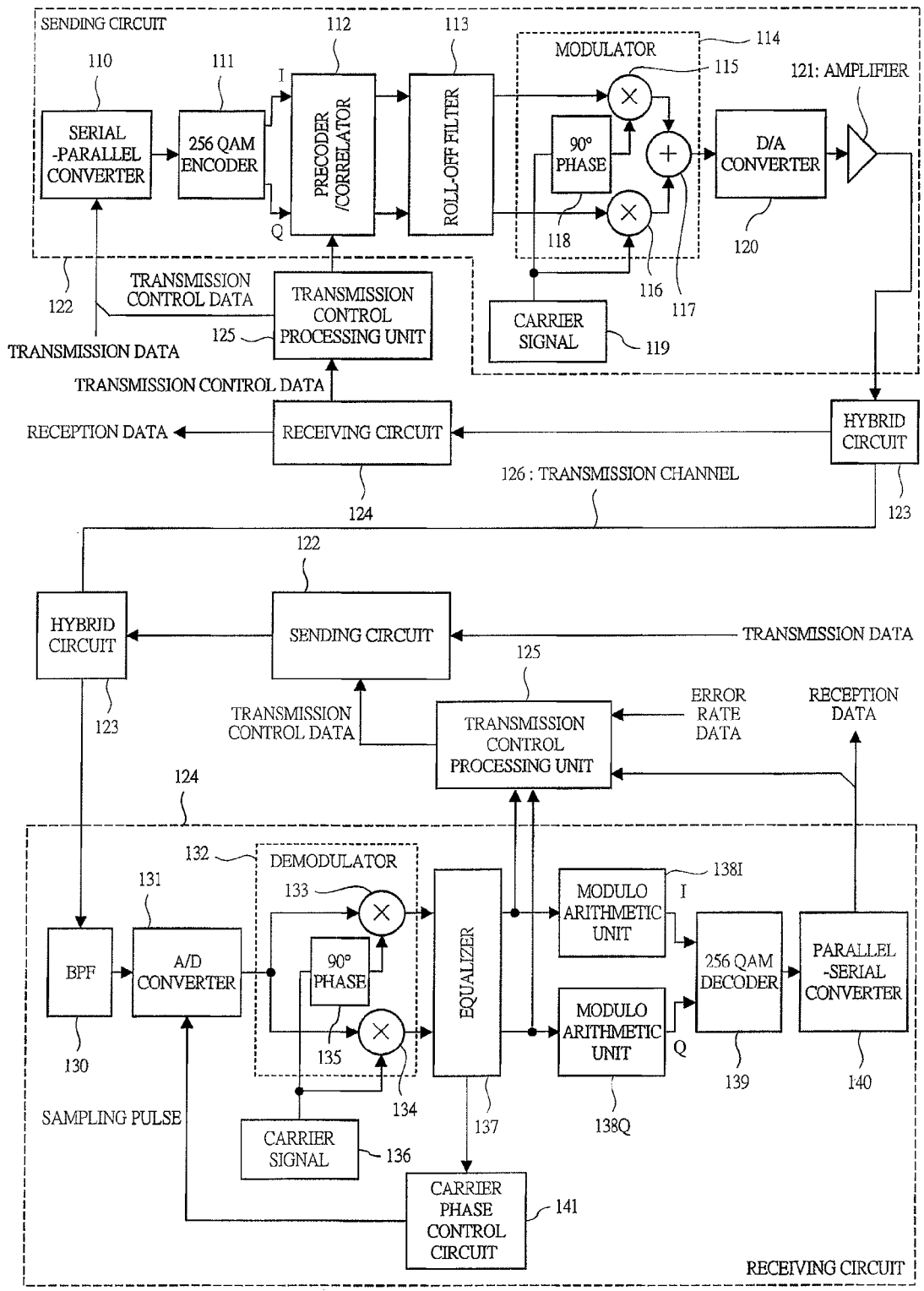
FIG. 8 is a block diagram showing the configuration of a third embodiment of the signal transmission apparatus of the present invention.
Figure 17:
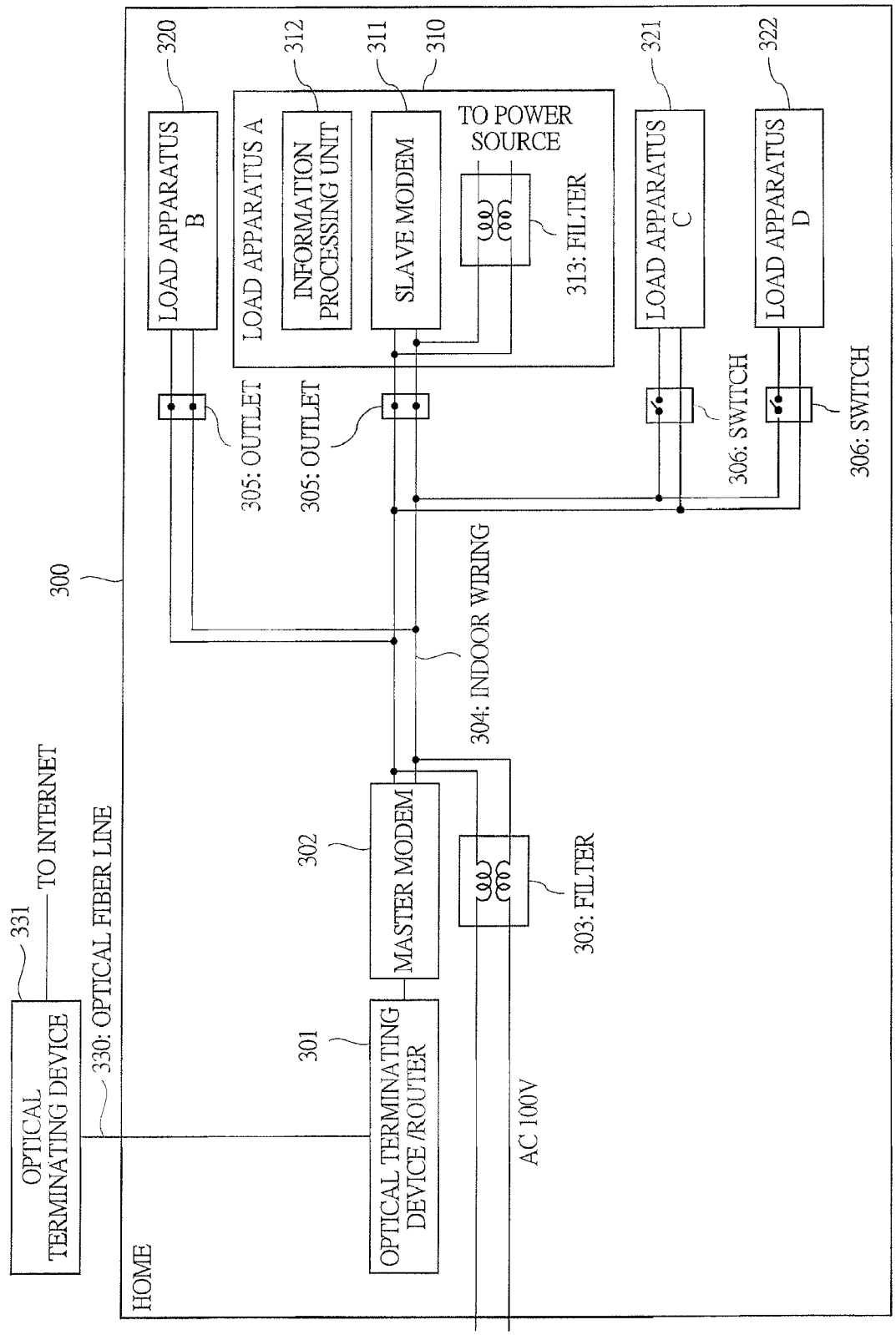
FIG. 17 is a block diagram showing a configuration example of the PLC system in a home.

Hereinafter, the third embodiment of the present invention will be described. FIG. 8 is a block diagram showing the configuration of the third embodiment of the signal transmission apparatus of the present invention. The upper part of FIG. 8 corresponds to a sending circuit and the lower part thereof corresponds to a receiving circuit. In this system, the signal transmission apparatuses having the same configuration (master MODEM 302 and slave MODEM 311 in FIG. 17) are connected to both ends of a transmission channel 126 (indoor wiring 204 in FIG. 17).

In a sending circuit 122, digital transmission data is converted to, for example, an 8-bit parallel signal by a serial-parallel converter 110. The 8-bit parallel signal is inputted to a 256 QAM encoder 111, and the 256 QAM encoder 111 converts the signal to a 256 QAM signal having 16×16 lattice by a known method and outputs signals I and Q.

A precoder/correlator 112, details of which will be described later, performs the processes according to the present invention to the signals I and Q so as to obtain a desired notch characteristic. The signals I and Q after the process are filter-processed by a roll-off filter 113 and the signals I and Q after the process are respectively QAM-modulated by a modulator 114.

In the meantime, a carrier signal 119 is inputted to a multiplier 116 and a 90° phase shifter 118 and an output of the 90° phase shifter 118 is inputted to a multiplier 115. Also, outputs of the two multipliers 115 and 116 are inputted to an adder 117. Note that the process up to the modulator 114 can be executed by an arithmetic operation by DSP.

An output signal of the adder 117 is converted to an analog signal by a D/A converter 120, amplified by an amplifier 121 and sent to a transmission channel 125 such as a power line through a hybrid circuit 123. Note that, if half-duplex communication is to be performed, any switch circuit can be used instead of the hybrid circuit 123. The function and process of the sending circuit except the precoder/correlator 112 are the same as those of a conventional QAM sending circuit.

In a receiving circuit 124, a reception signal passing through a BPF (band pass filter) 130 is A/D converted by an A/D converter 131 and then QAM-demodulated by a demodulator 132. An equalizer 137 performs filter process with an inverse characteristic to the frequency characteristic of the transmission channel so as to equalize the distortion of the transmission channel. An adjustment method of the equalizer is well-known. A carrier phase control circuit 141 reproduces a carrier synchronized in phase from the reception signal based on the equalization of the equalizer 137 by the known means, thereby generating a sampling pulse of the A/D converter 131.

Modulo arithmetic units 138I and 138Q perform modulo arithmetic operation to the output signal from the equalizer 137 and output the signals I and Q. The signals I and Q are inputted to a 256 QAM decoder 139, and the 256 QAM decoder 139 converts the signals to the 8-bit parallel signals by a known method. A parallel-serial converter 140 converts the 8-bit parallel signal to a serial signal. Though not shown, an error detection/correction circuit or processing function exists thereafter, and an error rate data is outputted.

In the receiving circuit 124, the function and process except the modulo arithmetic units 138I and 138Q are the same as those of a conventional QAM receiving circuit. In the meantime, it is also possible to provide the sending unit, the receiving unit and the hybrid circuit to both ends of the transmission channel 126 so as to enable entire duplex transmission. Also, the process after the demodulator 132 can be executed by an arithmetic operation by DSP. The two transmission control processing units 125 perform the process described later and measure the characteristic of the transmission channel 126 in cooperation with the transmission control processing unit 125 on the opposite side, thereby controlling the characteristic of the precoder/correlator 112.

Figure 9A:
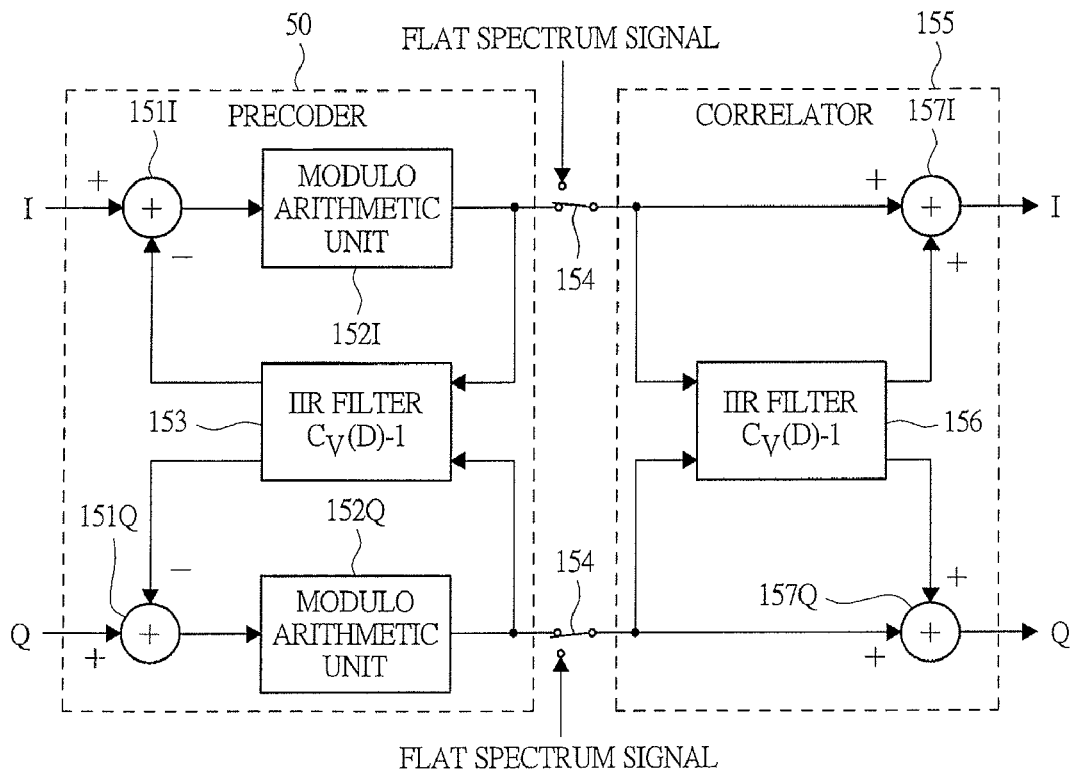
FIG. 9A is a block diagram showing the configuration of a precoder/correlator 112 of the present invention.
Figure 9B:
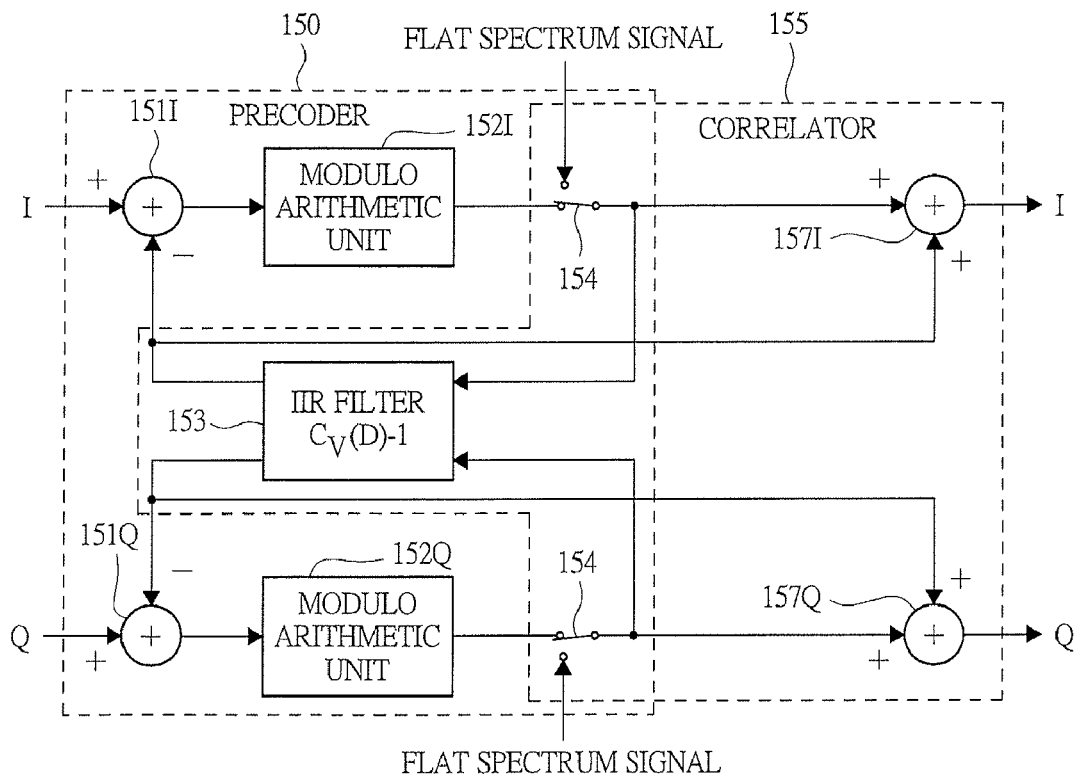
FIG. 9B is a block diagram showing the configuration of a precoder/correlator 112 of the present invention.

FIG. 9A and FIG. 9B are block diagrams showing the configurations of the precoder/correlator 112 of the present invention. FIG. 9A is a functional block diagram thereof, and FIG. 9B shows the configuration of the precoder/correlator 112 in which an IIR filter 156 performing the same process as an IIR filter 153 is omitted from the configuration in FIG. 9A.

The precoder 150 includes adders 151I and 151Q corresponding to the signals I and Q, modulo arithmetic units 152I and 152Q and the IIR filter 153 functioning as a feedback filter. The adders 151I and 151Q subtract an output signal of the IIR filter 153 from the input signals I and Q, respectively. The modulo arithmetic units 152I and 152Q perform modulo arithmetic operation to the output signals of the adders 151I and 151Q, respectively. The input/output characteristics of the modulo arithmetic units 152I and 152Q are shown in FIG. 4.

The outputs of the modulo arithmetic units 152I and 152Q are outputted to the correlator 155 on a next stage and inputted to the IIR filter 153. The configuration of the IIR filter 153 is shown in FIG. 3.

In the IIR filter 153, arithmetic operation is carried out with using a complex number having the inputted signal I as a real number and the signal Q as an imaginary number, and the real number portion and the imaginary number portion of the complex number which are output signals of the filter are outputted to the adder 151I and the adder 151Q, respectively. The transfer function H of the filter is assumed to be H=Cv (D)−1, where D=$z^{-1}$. The Cv(D) is a transfer function which indicates a desired notch characteristic defined by the following Equation 4.

$$C_V(D) = \prod_{i=1}^{N} C \frac{1 - a_i e^{j\pi f_i} D}{1 - b_i e^{j\pi f_i} D}$$ [Equation 4]

$$0 < a_i < b_i \le 1$$

Π designates an operator for multiplication of each term, N designates the number of notches, a and b designate coefficients for determining the depth and width of the notch, and f designates a notch frequency. Respective coefficients $p_1$ to $p_n$ and $q_0$ to $q_n$ of the IIR filter are obtained by calculating the coefficients by expanding the denominator and numerator of H=C(D)−1 based on the above-described C(D).

In the correlator 155, the outputs of the IIR filter 156 which executes the same process as the IIR filter 153 and the outputs of the modulo arithmetic units 152I and 152Q are added up by the two adders 157I and 157Q and then outputted. Note that, when a flat spectrum signal is sent at the time of initial setting or the like in the present invention, a switch 154 on a previous stage of the correlator 155 is switched so as to insert, for example, a known PN signal. At this time, nothing is set as the IIR filter 156 of the correlator 155.

Next, the operation thereof will be described. The output signal of the precoder 150 is a random (flat spectrum) signal because the modulo arithmetic unit 152 is inserted. Also, the correlator 155 shown in FIG. 9A is equivalent to a filter whose transfer function is C(D). Therefore, the spectrum of the output signal of the correlator 155 is shaped into a form corresponding to the transfer function C(D). If the characteristic of the notch filter having the notch in a desired frequency is set as the transfer function C(D), the spectrum of the output signal becomes a signal having the notch (spectrum null point) in a specified frequency.

In the method of providing the notch characteristic according to the present invention, a specified frequency component is not simply damped from a generated transmission signal, but an entire signal is processed so that the power of the specified frequency component is reduced. Therefore, the transmitted QAM signal does not have the lattice arrangement at an equal interval.

If it is confirmed that the null point exists in a specified frequency in the transmission channel, the characteristic having the notch in this specified frequency is set as the above-described transfer function C(D). Consequently, since the output signal turns to a signal hardly containing the specified frequency, even if it is passed through the transmission channel having the notch, a signal having substantially the same spectrum as that on the sending side is received on the receiving side. Then, the necessity of equalizing the notch portion is eliminated in the equalizer on the receiving side, so that the equalizer does not diverge. Therefore, the original signal can be reproduced only by passing through the modulo arithmetic unit on the receiving side, so that the deterioration of the transmission efficiency is slight as compared with a case where no notch is provided.

Figure 12A:
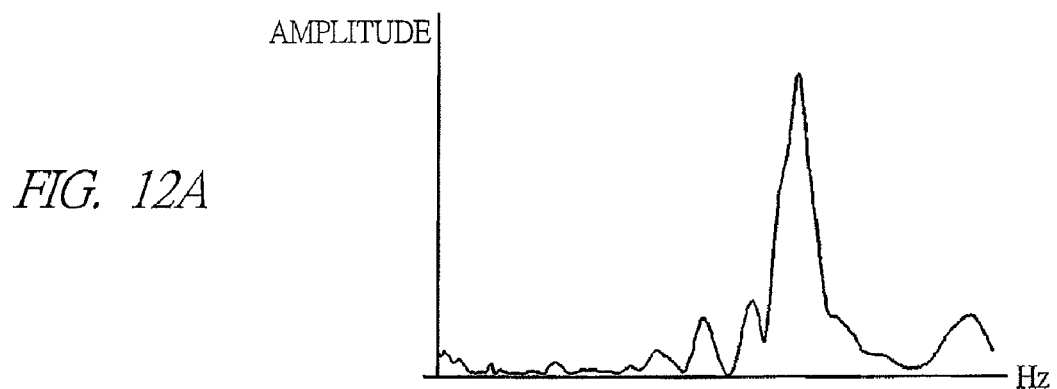
FIG. 12A is a graph showing a simulation result of frequency amplitude characteristic of a transmission channel.

FIG. 12A to FIG. 12D are graphs showing the simulation results of the frequency amplitude characteristic of the transmission channel, equalizer and correlator. FIG. 12A shows an example of the spectrum of the transmission channel and the spectrum null points exist at frequency positions corresponding to black circles in FIG. 12B.

Figure 12B:
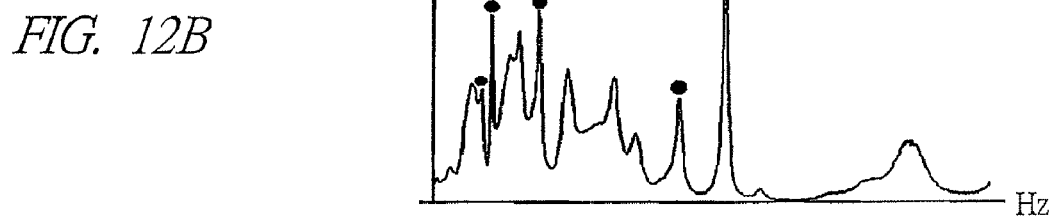
FIG. 12B is a graph showing a simulation result of frequency amplitude characteristic of an equalizer.

Theoretically, the equalizer needs to have the characteristic as shown in FIG. 12B in order to achieve an inverse spectrum to the transmission channel. However, this characteristic includes a number of pointed spikes facing upward and is difficult to be achieved with an FIR filter equalizer having a finite length. Hence, largely pointed spikes are detected from the spikes facing upward. In FIG. 12B, five spikes facing upward, which are provided with black circles, are detected.

Figure 12C:
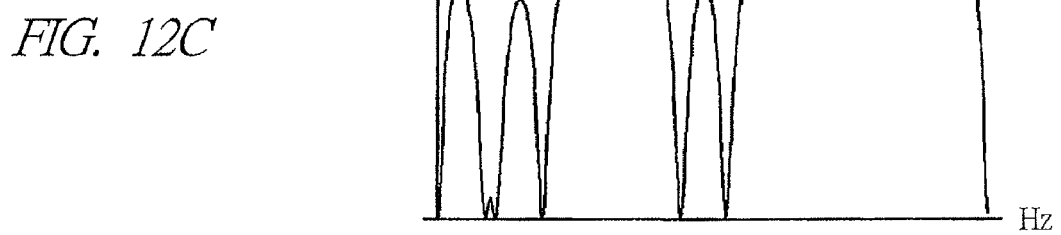
FIG. 12C is a graph showing a simulation result of frequency amplitude characteristic of a correlator.

FIG. 12C shows the characteristic in which the notch is inserted into frequency positions of the spikes of FIG. 12B by the correlator 155. Therefore, a signal having the spectrum of FIG. 12C is sent to the transmission channel. On the receiving side, forced equalization is carried out so that the equalization output matches with this signal (training in which a predetermined transmission signal is sent and the equalizer outputs that signal is performed).

Figure 12D:
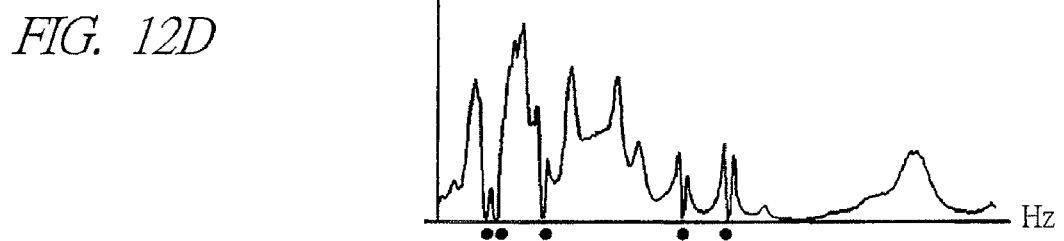
FIG. 12D is a graph showing a simulation result of frequency amplitude characteristic of an equalizer.

As a result, the equalizer achieves the spectrum as shown in FIG. 12D. At the positions where the black circles are provided, the spikes originally exist. However, since the notch is applied, the equalization is not needed and the spikes are small. Consequently, difficulty of equalizing the spike in the equalizer is avoided and the accurate equalization can be realized.

Figure 13:
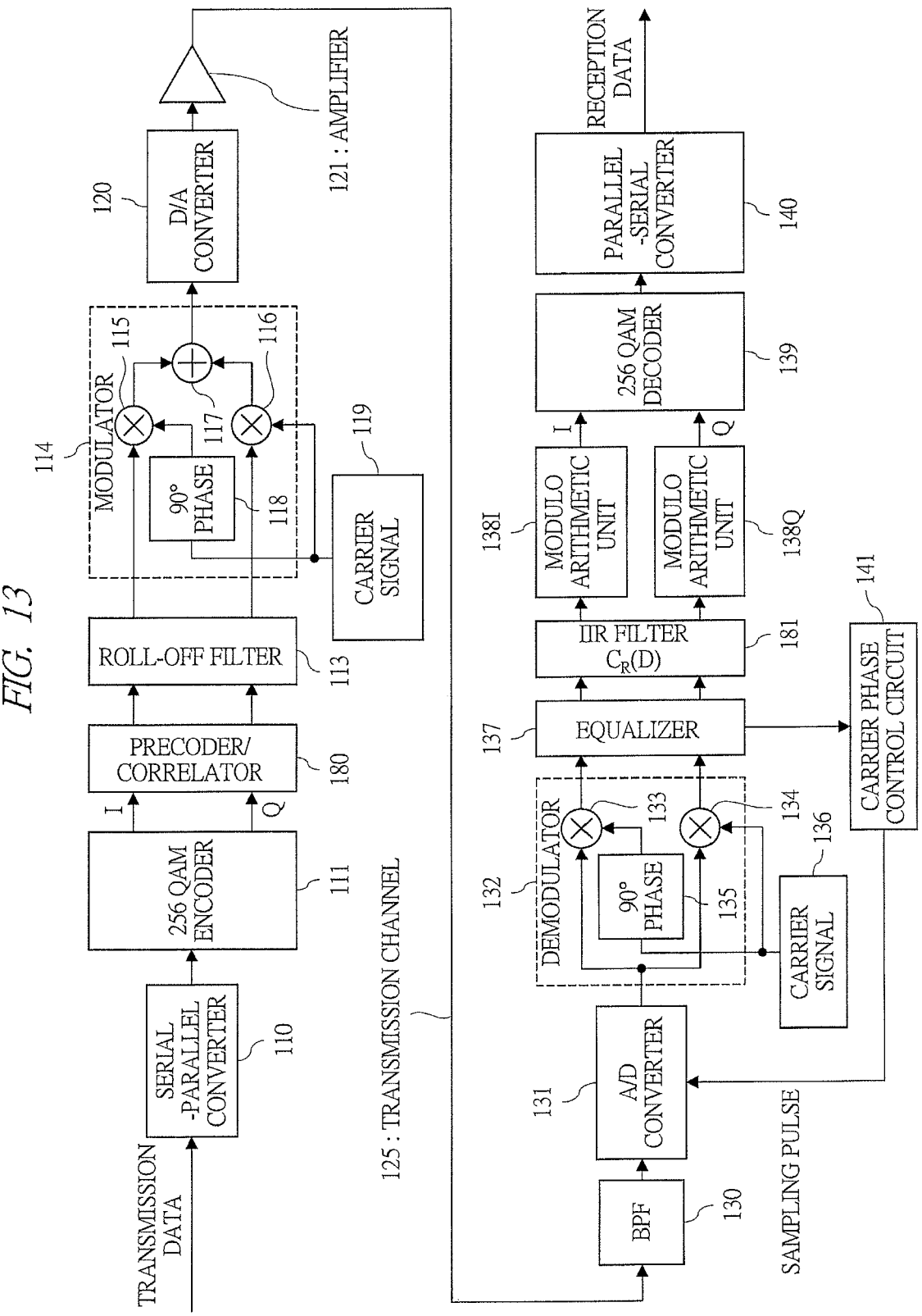
FIG. 13 is a block diagram showing the configuration of a modified embodiment of the signal transmission apparatus of the present invention.

FIG. 13 is a block diagram showing the configuration of a modified embodiment of the signal transmission apparatus of the present invention. In this embodiment, a part (or all) of the function of the correlator 155 in the above-described third embodiment is moved to the receiving side, thereby suppressing the external noise. The difference between the modified embodiment and the third embodiment lies in the characteristic of the filter in a precoder/correlator 180 and an IIR filter 181 added to the receiving unit side. Hereinafter, the difference from the third embodiment will be described.

Figure 14:
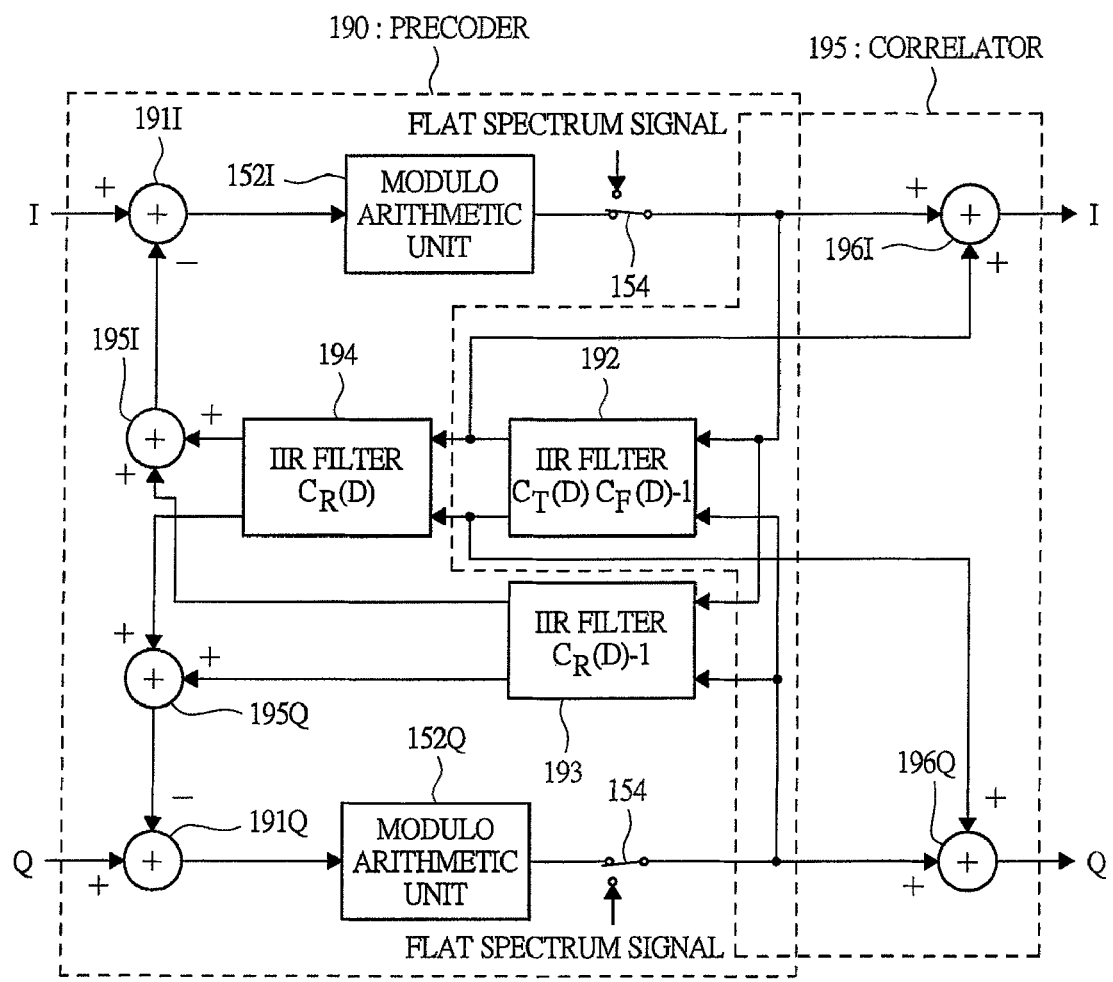
FIG. 14 is a block diagram showing the configuration of a precoder/correlator 180 of the modified embodiment.

FIG. 14 is a block diagram showing the configuration of the precoder/correlator 180 of the modified embodiment. The block of the precoder/correlator 180 of the modified embodiment is the same as that of the third embodiment shown in FIG. 9B. However, the transfer function set in an IIR filter of a precoder 190 is a product between transfer functions $C_T(D)$ and $C_F(D)$ corresponding to variable notch characteristic and fixed notch characteristic which suppress the transmission signal and a transfer function $C_R(D)$ corresponding to the notch characteristic which suppresses the external noise signal in the receiving unit.

More specifically, the signal to be inputted to an adder 191 is $[C_T(D)*C_F(D)*C_R(D)-1]$. On the other hand, the signal to be inputted to an adder 196 of a correlator 195 is $[C_T(D)*C_F(D)-1]$. Therefore, the transmission signal has the notch characteristic corresponding to the transfer function $[C_T(D)*C_F(D)]$.

Note that, in the present invention, $C_T(D)$ is a transfer function of a variable notch filter on a sending side to be adjusted in accordance with the characteristic of the transmission channel, and $C_F(D)$ is a transfer function of a fixed notch filter on a transmission side which inserts a notch in a known and fixed band. Further, $C_T(D)$ is expressed by the following Equation 5, and $C_F(D)$ and $C_R(D)$ are expressed in the same way.

$$C_T(D) = \prod_{i=1}^{N} C \frac{1 - c_i e^{j\pi f_i} D}{1 - d_i e^{j\pi f_i} D}$$ [Equation 5]

$$0 < c_i < d_i \leq 1$$

An output signal of the equalizer 137 is inputted to the IIR filter 181 on the receiving unit side. The transfer function $C_R(D)$ corresponding to the notch characteristic which suppresses the external noise signal is set in the IIR filter 181 in which a part of the function of the correlator is moved to the receiving side unit.

For example, when an external noise exists in a specified frequency, the transfer function $C_R(D)$ is set to the characteristic for notching the frequency of the noise. Then, the noise power is suppressed by the IIR filter 181 on the receiving unit side. However, since the transmission signal originally has almost no power of that frequency, the transmission signal is not affected so much. Therefore, the data error rate can be improved.

If it has been confirmed in advance that the notch is required in order to suppress radiation of noise in a specified frequency, it is preferable to set that notch characteristic in $C_F(D)$. If the notch is set, radiation of noise in the specified frequency can be suppressed even in the procedure for adjusting the equalizer described later.

In case of the modified embodiment, information of the transfer function $C_R(D)$ needs to be transmitted to the unit on the opposite side. Although an example in which both notch of the transmission signal and notch of the external noise are executed has been described in the modified embodiment, it is also possible to carry out only the notch of the external noise, and in this case, the correlator 195 on the sending unit side is not required.

Figure 15:
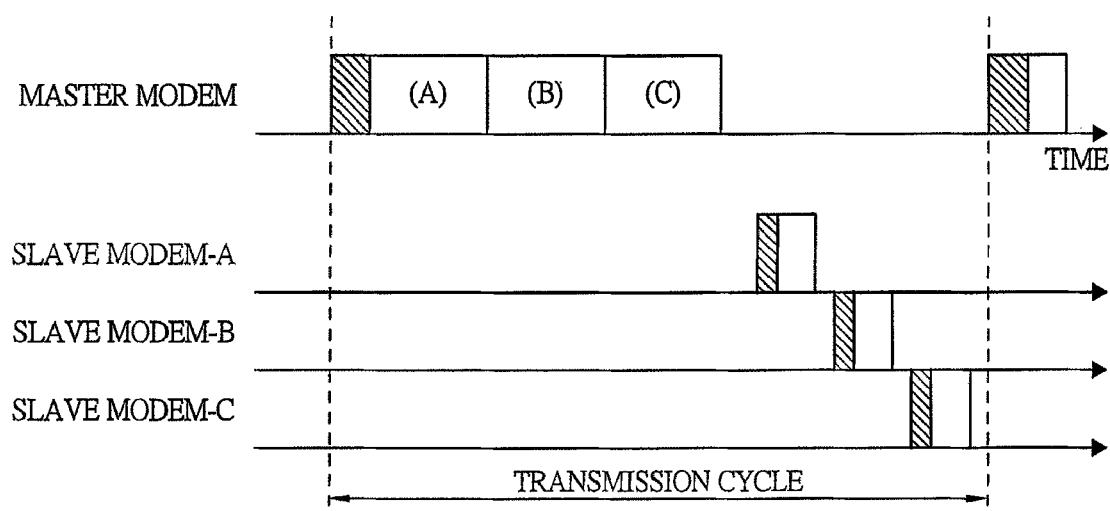
FIG. 15 is a time chart showing signal transmission in the PLC system of the present invention.

Next, a method for measuring the notch frequency of the transmission channel 126 (304) will be described. FIG. 15 is a time chart showing the signal transmission in the PLC system of the present invention. Although an example in which the master MODEM and a plurality of the slave MODEMs (A, B, C) execute half-duplex communication is disclosed in this embodiment, full duplex communication is also possible, and any known method such as the time slot allocation, poling and CSMA can be applied as an access control method.

FIG. 10 is a flow chart showing the contents of the null point search process 1 of the present invention. In this method, the MODEM on one side sends a flat spectrum signal, and the MODEM on the opposite side receives this signal and executes FFT process to detect a null point and notify the opposite MODEM of the detected point. Although this process is executed in, for example, the initial setting procedure, it may be executed in a preamble signal sending period which is a shaded portion in FIG. 15.

In the meantime, in the initial setting procedure between the MODEMs at the time of turning on power, the low-speed transmission protocol which does not require equalization indicated by dotted line in FIG. 10 is required. In the present invention, it is possible to adopt any known low-speed transmission protocol having required characteristics such as the ASK signal of several tens to several hundreds kbps.

First, the MODEM (A) on one side sends a connection request by the low-speed transmission protocol in S10. The connection request includes a local station ID and opposite station ID information. The other MODEM (B) which is an opposite station receives the connection request in S20 and sends an ID confirmation signal by the low-speed transmission protocol.

The MODEM (A) receives the ID confirmation signal in S11 and sends an ACK signal. The MODEM (B) sends a start command of measurement signal transmission in S21. The MODEM (A) sends a flat spectrum (PN) signal in S12. As for the flat spectrum signal, if a known fixed notch corresponding to $C_F(D)$ is provided as described in the modified embodiment shown in FIG. 14, the spectrum is not flat but the notch (null point) exists.

In S22, the MODEM (B) receives the flat spectrum signal and accumulates the A/D converted reception signal. In S23, this reception signal is subjected to FFT process to detect the spectrum null point fn. Note that, if the known fixed null point exists, this point is excluded from the detection data. In S24, fn is notified to the opposite unit MODEM (A).

In S13, the MODEM (A) adjusts the precoder and the correlator so that the notch is provided in fn of the transmission signal. Next, in S14, the MODEM (A) sends a known equalization test signal. The MODEM (B) forces the equalizer to perform the equalization in S25. Consequently, the adjustment of the equalizer of the MODEM (B) is completed.

Next, in S26, the MODEM (B) sends the flat spectrum (PN) signal. In S15, the MODEM (A) receives the flat spectrum signal and accumulates the A/D converted reception signal. In S16, this reception signal is subjected to the FFT process so as to detect the spectrum null point fn. In S17, fn is notified to the opposite unit MODEM (B).

In S27, the MODEM (B) adjusts the precoder and the correlator so that the notch is provided in fn of the transmission signal. In S28, a known equalization test signal is sent. In S18, the MODEM (A) forces the equalizer to perform the equalization. Consequently, the adjustment of the equalizer of the MODEM (A) is also completed.

Since the signal in which a signal power at the spectrum null point of the transmission channel is suppressed can be generated and sent by the above-described process, the deterioration of a signal due to the spectrum null point of the transmission channel and diversion of the equalizer can be prevented, and the transmission efficiency can be improved.

Figure 11:
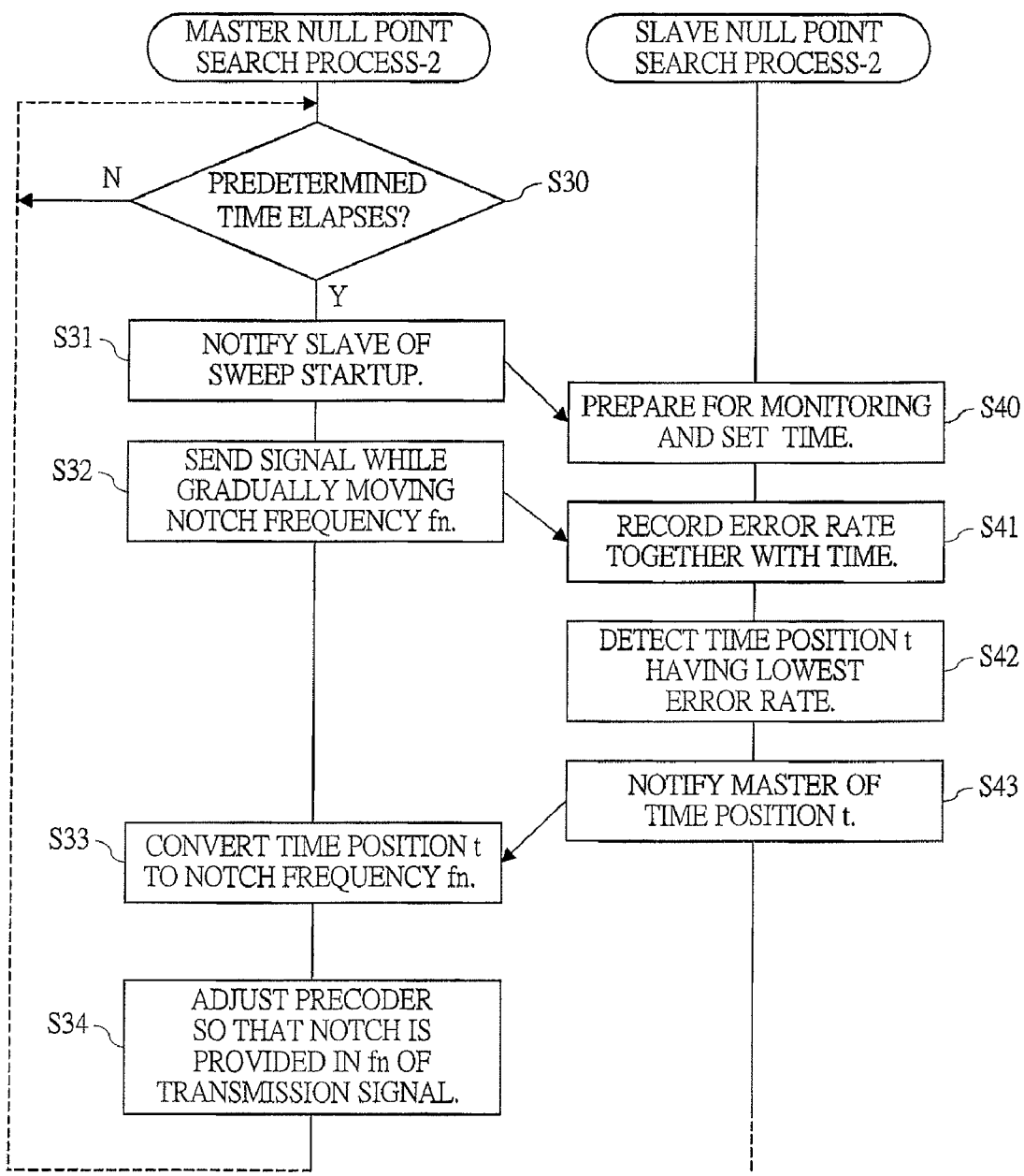
FIG. 11 is a flow chart showing the contents of null point search process 2 of the present invention.

In the fourth embodiment, with using the data transmission periods (A) to (C) to each MODEM in FIG. 15, the notch frequency is measured cyclically or when the transmission quality is deteriorated. FIG. 11 is a flow chart showing the contents of the null point search process 2 of the present invention. In this process, the notch frequency is moved at a slow speed which the equalizer on the receiving side can follow in the master MODEM, and a time position in which the transmission quality is optimum on the receiving side is detected, and then, this time position is converted to the notch frequency.

In S30, the master MODEM determines whether or not a predetermined time elapses after a previous process, and when a determination result is negative, the procedure proceeds to S30. On the other hand, when it is positive, the procedure proceeds to S31. In the meantime, whether or not the transmission quality is deteriorated below a predetermined value may be determined instead. In S31, sweep start is notified to a slave MODEM. In S32, the master MODEM sends a signal while gradually sweeping (moving) the notch frequency fn at a predetermined speed.

In S40, the slave MODEM prepares for monitoring and sets (starts) a clock. In S41, a signal error rate obtained from the signal error detection/correction process is recorded together with time. In S42, a time position t having the lowest error rate is detected. In S43, the time position t is notified to the master MODEM.

In S33, the master MODEM converts the time position t to the notch frequency fn. In S34, the precoder and the correlator are adjusted so that the notch is provided in fn of the transmission signal (fn is added to a variable notch set in advance). Through the process as described above, the notch frequency can be searched and measured while transmitting the data.

Figure 16:
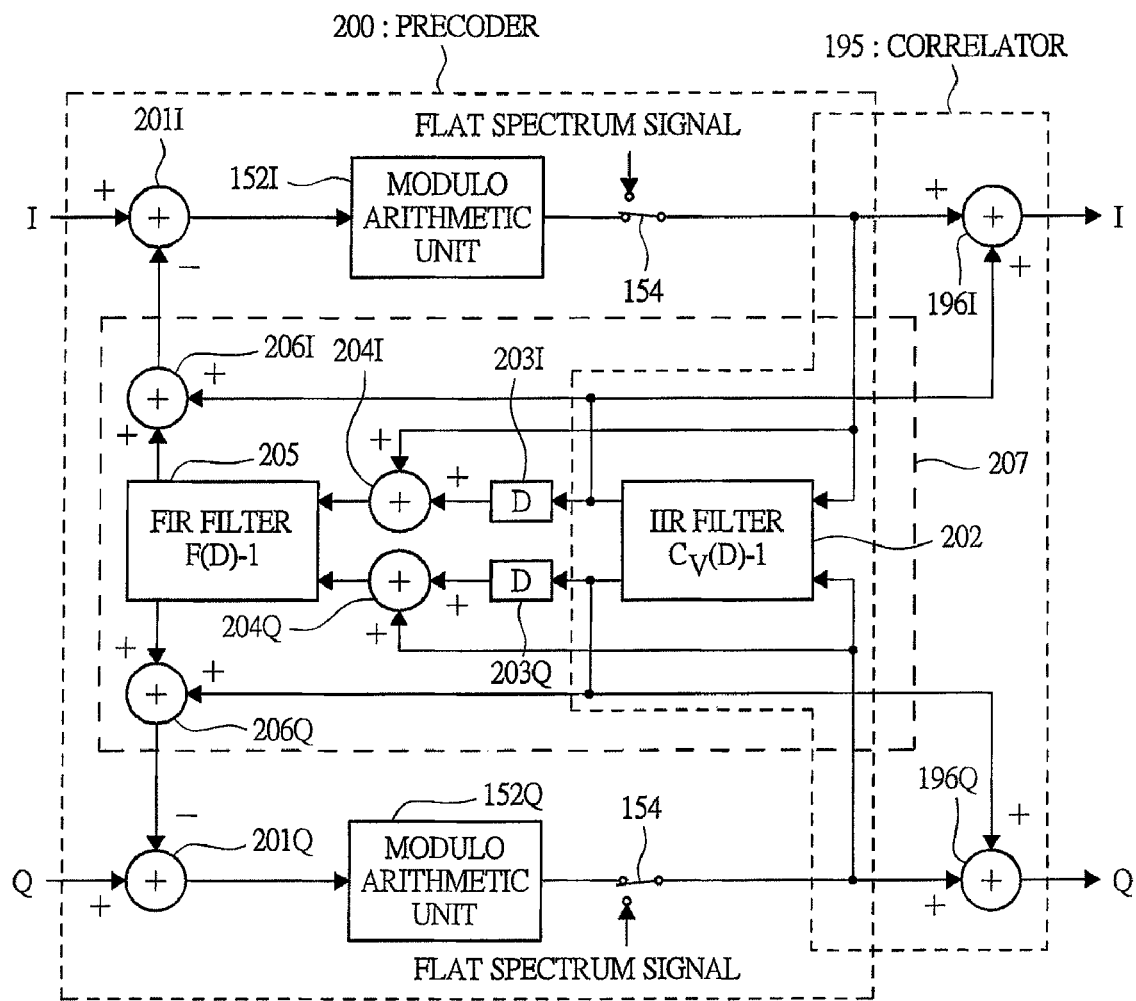
FIG. 16 is a block diagram showing the configuration of a precoder/correlator 180 of a fifth embodiment.

The fifth embodiment is a modified embodiment of the third embodiment and describes an example in which an equalization processing function of the transmission channel is added in addition to a process for providing the notch to a signal. The entire block is the same as the configuration of the third embodiment shown in FIG. 8. The difference from the third embodiment lies in the configuration of the precoder/correlator 180. FIG. 16 is a block diagram showing the configuration of the precoder/correlator 180 of the fifth embodiment.

An IIR filter 202 is an IIR filter for providing the notch to the signal like the IIR filter 153 shown in FIG. 9B. An output of the IIR filter 202 is added to an input signal of the IIR filter 202 by the adders 204I and 205Q through delay elements (function) 203I and 203Q in a single symbol interval.

Outputs of the adders 204I and 204Q are inputted to an FIR filter 205. An output of the FIR filter 205 is added to an output signal of the IIR filter 202 by the adders 206I and 206Q and then outputted to the adders 201I and 201Q.

The characteristic of the entire feedback filter 207 is [F(D)*C(D)−1]. Note that the configuration of the filter shown in FIG. 14 has the same characteristic $[C_R(D)*C_T(D)*C_F(D)-1]$ in terms of the entire feedback filter although the configuration itself is different.

The FIR filter 205 is an FIR filter having a known configuration in which the amplitude characteristic thereof is approximate to the amplitude characteristic of the transmission channel, and it is determined by the following method so that the frequency amplitude characteristic on the receiving side is constant and the number of reception levels is as small as possible.

First, following two points can be given as objects.

F(D) is determined so that the amplitude characteristic is flat on the receiving side or |F(D)|=|H(D)| can be achieved. Note that H(D) is a transfer function which indicates the frequency characteristic of the transmission channel and is measured in advance. H(D) can be acquired using the method of the third embodiment at the time of the initial setting. Alternatively, it may be measured by a known method during transmission.

The number of levels (average power) on the receiving side determined by the characteristic of the precoder is set as small as possible.

Accordingly, the transfer function F(D) which determines the characteristic to be set to the FIR filter 205 is expressed as the following Equation 6, where $a_i$ is a complex number.

$$F(D)=a_0+a_1D+a_2D^2+a_3D^3+\ldots+a_ND^N \quad \text{[Equation 6]}$$

Next, evaluation functions $J_1$ and $J_2$ corresponding to the above-described objects (a) and (b) are determined as shown in the Equations 7 and 8.

$$J_1 = \int_{-\pi}^{\pi}(|H(D)|-|F(D)|)^2\,d\omega \quad \text{[Equation 7]}$$

$$J_2 = |a_1| + 2^2|a_2| + 3^2|a_3| + 4^2|a_4| + \ldots + N^2|a_N| \quad \text{[Equation 8]}$$

However, since the above-described two Equations are opposed to each other, the entire evaluation function is determined as follows in accordance with the degree of the emphasis. Here, $K_1$ and $K_2$ are fixed coefficients and are determined from the measurement data of the PLC transmission channel according to a statistical method so that the transmission efficiency is optimized. Note that, even if $K_1$ and $K_2$ are not optimum, the effect of the present invention can be obtained.

$$J=K_1J_1+K_2J_2 \quad \text{[Equation 9]}$$

The above-described J is minimized. In other words, an optimum F(D) is obtained by converging to a solution which minimizes J using a known method such as steepest descent method. In the meantime, F(D) is normalized so that a0 becomes 1 after the optimization and is expressed by the following Equation 10.

$$F(D)=1+a_1/a_0D+a_2/a_0D^2+\ldots+a_N/a_0D^N \quad \text{[Equation 10]}$$

According to the fifth embodiment, since the precoder 200 takes the equalizing function of only the amplitude characteristic of the transmission channel, the equalizer 137 on the receiving side is required to equalize only the phase characteristic of the transmission channel. Consequently, the amplitude characteristic of the equalizer becomes flat, and thus, the noise amplification by the equalizer can be minimized.

Further, the precoder 200 having the smallest number of levels on the receiving side can be selected because there is a degree of freedom in phase in the determination of F(D). Consequently, the SNR of the reception signal can be increased and the error rate can be decreased. In the meantime, the fifth embodiment and a modified embodiment of the third embodiment shown in FIG. 13 and FIG. 14 can be combined.

In addition to the third embodiment to the fifth embodiment described above, modified embodiments of the present invention described below are also possible. For example, the modified embodiment of the third embodiment (FIG. 13 and FIG. 14) has described the technology in which, when it is evident that a notch needs to be provided to suppress the radiation of noise in a specified frequency, the notch characteristic is set to $C_F(D)$ in advance. Alternatively, the following method can also be adopted.

That is, a PN series signal having a short cycle (for example, $2^9-1$) is cyclically sent directly without passing through the correlator with a power lower than the depth of a notch fixed in advance. Even in this manner, the radiation of noise in a specified frequency can be suppressed below a predetermined value.

Although the method using the flat spectrum signal and the example of sweeping the notch frequency have been described in the embodiments above, it is also possible to output a single carrier by sweeping the frequency from the master MODEM and further possible to sweep the frequency of the band pass filter instead of the FFT in a slave MODEM, using the flat spectrum signal.

In the fourth embodiment, an adjustment method on the master MODEM side has been described. However, adjustment of the precoder and the correlator on the slave MODEM side can be carried out in the same manner. Also, when there are a plurality of slave MODEMs, a notch frequency corresponding to each slave MODEM is measured and recorded, and then, setting/updating of the precoder is carried out each time when transmission is executed to each slave MODEM.

Although examples of using the IIR filter that can easily obtain the notch characteristic have been described in the third embodiment to the fifth embodiment, the configuration of the filter is arbitrary, and they can be carried out in the same manner even when the FIR filter is used.

The fifth embodiment discloses an example in which the equalization processing function of the transmission channel is added in addition to the process of providing the notch to the signal in the configuration of the third embodiment shown in FIG. 8.

However, the above-described equalization processing function of the transmission channel can be added to the configuration of the first embodiment whose entire block is shown in FIG. 1 and any other embodiments.

Although the signal transmission apparatus of the present invention is suitable for the PLC system, the signal transmission apparatus of the present invention can be applied to any digital signal transmission including the PLC system.

While the present invention has been illustrated and described with respect to a particular embodiment thereof, it should be appreciated by those of ordinary skill in the art that various modifications to this invention may be made without departing from the spirit and scope of the present invention.

What is claimed is:

1. A signal transmission apparatus for transmitting a signal while suppressing a transmission power or an external noise of a specified band in a usable frequency band, the signal transmission apparatus comprising:
    correlator means for shaping a spectrum of a signal into a spectrum containing a desired notch; and
    precoder means disposed on a previous stage of the correlator and including adding means which subtracts an output signal of feedback filter means from an input signal, modulo arithmetic means which inputs an output signal of the adding means and executes modulo arithmetic operation, and the feedback filter means which inputs an output signal of the modulo arithmetic means and is provided with a transfer function obtained by subtracting 1 from a transfer function of the correlator means.

2. The signal transmission apparatus according to claim 1, wherein the correlator means is IIR filter means having a desired notch characteristic.

3. The signal transmission apparatus according to claim 1, wherein at least a part of a function of the correlator means is provided in a receiving side unit.

4. The signal transmission apparatus according to claim 1 further comprising:
    QAM coding means disposed on a previous stage of the precoder means; and
    QAM modulating means disposed on a latter stage of the correlator means.

5. The signal transmission apparatus according to claim 1, wherein the feedback filter means doubles as a part of a function of the correlator means.

6. The signal transmission apparatus according to claim 1, wherein a transmission function representing a frequency characteristic of the feedback filter means includes a transfer function which approximates frequency-amplitude characteristics of a transmission channel and minimizes the number of levels of a symbol of a transmission correlating signal.

7. A signal transmission method for transmitting a signal while suppressing a transmission power or an external noise of a specified band in a usable frequency band, the signal transmission method comprising:
    a step of inputting a result of subtracting an output signal of feedback filter means from an input signal and executing modulo arithmetic operation, and outputting resultant signals to correlator means and the feedback filter means having a transfer function obtained by subtracting 1 from a transfer function of the correlator means; and
    a step of shaping a spectrum of a signal into a spectrum containing a desired notch by the correlator means provided with a characteristic represented by the transfer function.

8. A signal transmission apparatus for transmitting a signal while suppressing a transmission power or an external noise of a specified band in a usable frequency band, the signal transmission apparatus comprising:
    correlator means for shaping a spectrum of a signal;
    precoder means disposed on a previous stage of the correlator and including adding means which subtracts an output signal of feedback filter means from an input signal, modulo arithmetic means which inputs an output signal of the adding means and executes modulo arithmetic operation, and the feedback filter means which inputs an output signal of the modulo arithmetic means and is provided with a transfer function obtained by subtracting 1 from a transfer function of the correlator means;
    measuring means for measuring a frequency of a spectrum null point of a transmission channel; and
    adjusting means for adjusting the correlator means and the precoder means based on a measured notch frequency of the transmission channel.

9. The signal transmission apparatus according to claim 8, wherein the measuring means includes:
    means for sending a flat spectrum signal;
    null point detecting means for receiving the flat spectrum signal from an opposite unit and generating spectrum information by Fourier transform, thereby detecting the frequency of the spectrum null point; and
    notifying means for notifying frequency information of the detected null point to the opposite unit.

10. The signal transmission apparatus according to claim 8, wherein a transmission function representing a frequency characteristic of the feedback filter means includes a transfer function which approximates frequency-amplitude characteristics of a transmission channel and minimizes the number of levels of a symbol of a transmission correlating signal.

11. A signal transmission apparatus for transmitting a signal while suppressing a transmission power or an external noise of a specified band in a usable frequency band, the signal transmission apparatus comprising:
    correlator means for shaping a spectrum of a signal;
    precoder means disposed on a previous stage of the correlator and including adding means which subtracts an output signal of feedback filter means from an input signal, modulo arithmetic means which inputs an output signal of the adding means and executes modulo arithmetic operation, and the feedback filter means which inputs an output signal of the modulo arithmetic means and is provided with a transfer function obtained by subtracting 1 from a transfer function of the correlator means;
    sweep control means for adjusting the precoder means and the correlator means so that a notch frequency moves at a speed which an equalizer on a receiving side can follow;

transmission quality monitoring means for recording a transmission quality of a transmission channel together with a time position and detecting a time position in which the transmission quality is optimum;

means for converting the time position to a notch frequency; and adjusting means for adjusting the correlator means and the precoder means based on the converted notch frequency.

12. The signal transmission apparatus according to claim 11, wherein the sweep control means notifies a signal transmission apparatus on an opposite side of a sweep start, and the signal transmission apparatus on the opposite side records a passage time since the sweep start as the time position.

13. The signal transmission apparatus according to claim 11, wherein a transmission function representing a frequency characteristic of the feedback filter means includes a transfer function which approximates frequency-amplitude characteristics of a transmission channel and minimizes the number of levels of a symbol of a transmission correlating signal.

14. A signal transmission method for transmitting a signal while suppressing a transmission power or an external noise of a specified band in a usable frequency band, the signal transmission method comprising:

a step of measuring a frequency of a spectrum null point of a transmission channel; and a step of, based on the measured frequency of the null point of the transmission channel, adjusting correlator means for shaping a spectrum of a signal and precoder means disposed on a previous stage of the correlator and including adding means which subtracts an output signal of feedback filter means from an input signal, modulo arithmetic means which inputs an output signal of the adding means and executes modulo arithmetic operation, and the feedback filter means which inputs an output signal of the modulo arithmetic means and is provided with a transfer function obtained by subtracting 1 from a transfer function of the correlator means.

15. A signal transmission method for transmitting a signal while suppressing a transmission power or an external noise of a specified band in a usable frequency band, the signal transmission method comprising:

a step of adjusting precoder means for shaping a spectrum of a signal and precoder means so that a notch frequency moves at a speed which an equalizer on a receiving side can follow, the precoder means being disposed on a previous stage of the correlator and including adding means which subtracts an output signal of feedback filter means from an input signal, modulo arithmetic means which inputs an output signal of the adding means and executes modulo arithmetic operation, and the feedback filter means which inputs an output signal of the modulo arithmetic means and is provided with a transfer function obtained by subtracting 1 from a transfer function of the correlator means;

a step of recording a transmission quality of a transmission channel on a receiving side and detecting a time position in which the transmission quality is optimum;

a step of converting the time position to a notch frequency; and a step of adjusting the correlator means and the precoder means based on the converted notch frequency.

* * * * *